United States Patent
Kwon et al.

(10) Patent No.: US 9,054,835 B2
(45) Date of Patent: Jun. 9, 2015

(54) APPARATUS AND METHOD FOR ESTABLISHING UPLINK SYNCHRONIZATION IN A WIRELESS COMMUNICATION SYSTEM

(75) Inventors: Kibum Kwon, Seoul (KR); Myungcheul Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 250 days.

(21) Appl. No.: 13/578,531

(22) PCT Filed: Feb. 10, 2011

(86) PCT No.: PCT/KR2011/000909
§ 371 (c)(1),
(2), (4) Date: Aug. 10, 2012

(87) PCT Pub. No.: WO2011/099795
PCT Pub. Date: Aug. 18, 2011

(65) Prior Publication Data
US 2012/0307821 A1 Dec. 6, 2012

(30) Foreign Application Priority Data

Feb. 10, 2010 (KR) .................. 10-2010-0012564
Mar. 26, 2010 (KR) .................. 10-2010-0027230
Jan. 28, 2011 (KR) .................. 10-2011-0008683

(51) Int. Cl.
*H04J 3/06* (2006.01)
*H04L 5/00* (2006.01)
(Continued)

(52) U.S. Cl.
CPC .............. *H04L 5/001* (2013.01); *H04L 5/0007* (2013.01); *H04W 88/08* (2013.01); *H04W 92/10* (2013.01); *H04B 1/7087* (2013.01); *H04W 56/0045* (2013.01)

(58) Field of Classification Search
CPC .............. H04W 56/00; H04W 74/002; H04W 74/0833; H04W 72/04; H04W 72/00; H04W 56/0045; H04W 92/10; H04W 88/08; H04B 7/216; H04B 1/7087; H04L 5/001; H04L 5/0007
USPC .................. 370/350, 329, 330, 337, 345, 347
See application file for complete search history.

(56) References Cited

U.S. PATENT DOCUMENTS 8,606,336 B2 * 12/2013 Womack et al. .............. 455/574
2009/0116434 A1 * 5/2009 Lohr et al. .................... 370/329
(Continued)

FOREIGN PATENT DOCUMENTS

| KR | 10-2008-0063023 | 7/2008 |
| KR | 10-2008-0079961 | 9/2008 |
| KR | 10-2009-0115913 | 11/2009 |

OTHER PUBLICATIONS

International Search Report of PCT/KR2011/000909 dated Dec. 7, 2011.

*Primary Examiner* — Chandrahas Patel
*Assistant Examiner* — Lan Huong Truong
(74) *Attorney, Agent, or Firm* — H.C. Park & Associates, PLC

(57) ABSTRACT

Uplink synchronization establishment in a base station which operates a plurality of component carriers according to one embodiment of the present description, is performed in that the base station is connected to a user equipment, sets component carrier aggregation information, generates an uplink timing groups in the set component carrier aggregation, and transmits information on the thus-generated uplink timing groups to the user equipment.

30 Claims, 11 Drawing Sheets

(51) Int. Cl.
*H04W 56/00* (2009.01)
*H04W 88/08* (2009.01)
*H04W 92/10* (2009.01)
*H04B 1/7087* (2011.01)

(56) References Cited

U.S. PATENT DOCUMENTS

| | | | |
|---|---|---|---|
| 2009/0270094 A1* | 10/2009 | Ito et al. | 455/434 |
| 2009/0274120 A1 | 11/2009 | Chou | |
| 2009/0316642 A1* | 12/2009 | Yamada et al. | 370/329 |
| 2009/0318175 A1* | 12/2009 | Sandberg | 455/502 |
| 2010/0041399 A1 | 2/2010 | Kim et al. | |
| 2010/0086065 A1* | 4/2010 | Higuchi et al. | 375/260 |
| 2010/0111005 A1 | 5/2010 | Ahn et al. | |
| 2010/0118720 A1* | 5/2010 | Gauvreau et al. | 370/252 |
| 2010/0238857 A1* | 9/2010 | Zhang et al. | 370/328 |
| 2010/0323744 A1* | 12/2010 | Kim et al. | 455/522 |
| 2011/0170495 A1* | 7/2011 | Earnshaw et al. | 370/329 |

* cited by examiner

APPARATUS AND METHOD FOR ESTABLISHING UPLINK SYNCHRONIZATION IN A WIRELESS COMMUNICATION SYSTEM

CROSS-REFERENCE TO RELATED APPLICATIONS

This application is the National Stage Entry of International Application No. PCT/KR2011/000909, filed on Feb. 10, 2011 and claims priority from and the benefit of Korean Patent Application No. 10-2010-0012564, filed on Feb. 10, 2010, Korean Patent Application No, 10-2010-0027230, filed on Mar. 26, 2010, and Korean Patent Application No. 10-2011-0008683, filed on Jan. 28, 2011, all of which are hereby incorporated by reference for all purposes as if fully set forth herein.

BACKGROUND

1. Field

The present invention relates to a method and apparatus for establishing an uplink (UL) synchronization in a wireless communication system, and more particularly, to a method and apparatus for configuring a UL synchronization with respect to at least one Component Carrier (CC).

2. Discussion of the Background

Synchronization between a user equipment (UE) and an evolved node B (eNB) is an important issue in a wireless communication system since transmission/reception of information between the UE and the eNB may not be performed without synchronization.

Current wireless communication system needs to satisfy a user demand through use of a plurality of CCs, unlike a conventional wireless communication system that supports a single component carrier (CC) or a single service band. However, a detailed scheme for synchronization with respect to the plurality of CCs has not been provided yet.

Accordingly, there is a desire for a scheme for effective synchronization in a wireless communication using a plurality of CCs since synchronization is a factor that has a great effect on an efficiency of a network.

SUMMARY

Therefore, the present invention has been made in view of the above-mentioned problems, and an aspect of the present invention is to provide a method and apparatus for effectively operating a synchronization process by configuring an uplink (UL) synchronization in a wireless communication network supporting a plurality of CCs of Carrier Aggregation system for efficiency of a network, and secures stability of transmission/reception.

Another aspect of the present invention is to provide a method and apparatus for establishing synchronization in a wireless communication system.

Another aspect of the present invention is to provide a method and apparatus for transmitting/receiving synchronization information to be used for establishing synchronization in a wireless communication system.

Another aspect of the present invention is to provide a method and apparatus for configuring a synchronization group with respect to a plurality of CCs in a wireless communication system.

Another aspect of the present invention is to provide a method and apparatus for configuring a synchronization group with respect to a plurality of CCs based on a connection mode of a UE in a wireless communication system.

Another aspect of the present invention is to provide a method and apparatus for configuring a synchronization group based on characteristics of a plurality of CCs available in a wireless communication system.

Another aspect of the present invention is to provide a method and apparatus of a UE that may configure a UL timing synchronization group with respect to a plurality of CCs in a wireless communication system.

Another aspect of the present invention is to provide a method and apparatus of a UE that may obtain synchronization information associated with a plurality of CCs through a random access procedure in a wireless communication system, and may establish and update synchronization with an eNB.

In accordance with an aspect of the present invention, there is provided a method for an eNB to establish an uplink (UL) synchronization in a wireless communication system, the method including: receiving a synchronization request message from a user equipment (UE) through one or more delegate CCs in a UL timing group; and transmitting UL synchronization information corresponding to the UL timing group to the UE through the one or more CCs, so as to establish the UL synchronization, and the one or more delegate CCs are selected by the UE based on a state of the UL timing group and characteristics of a plurality of CCs forming the UL timing group, so as to establish the UL synchronization.

In accordance with another aspect of the present invention, there is provided a method for a UE to establish a UL synchronization in a wireless communication system, the method including: transmitting a synchronization request message to an eNB through one or more delegate CCs in a UL timing group; receiving UL synchronization information corresponding to the UL timing group for establishing the UL synchronization, from the eNB through the one or more delegate CCs; and establishing synchronization by applying, to the UL timing group, the UL synchronization information received through the one or more delegate CCs, and the one or more delegate CCs are selected by the UE based on a state of the UL timing group and characteristics of a plurality of CCs forming the UL timing group, so as to establish the UL synchronization.

In accordance with another aspect of the present invention, there is provided an eNB to establish a UL synchronization in a wireless communication system, the eNB including: a controller to generate UL synchronization information corresponding to a UL timing group, so as to establish the UL synchronization; and a transceiving unit to receive a synchronization request message from a user equipment (UE) through one or more delegate CCs in the UL timing group, and to transmit the UL synchronization information to the UE through the one or more delegate CCs, and the one or more delegate CCs are selected by the UE based on a state of the UL timing group and characteristics of a plurality of CCs forming the UL timing group, so as to establish the UL synchronization.

In accordance with another aspect of the present invention, there is provided a UE to establish a UL synchronization in a wireless communication system, the UE including: a transceiving unit to transmit a synchronization request message to an eNB through one or more delegate CCs in a UL timing group, and to receive UL synchronization information corresponding to the UL timing group through the one or more delegate CCs; a controller to determine the UL synchronization information received by the transceiving unit; and a UL timing adjusting unit to establish a UL synchronization of the UL timing group, based on the UL synchronization information determined by the controller, and the one or more delegate CCs are selected by the UE based on a state of the UL timing group and characteristics of a plurality of CCs forming the UL timing group, so as to establish the UL synchronization.

DETAILED DESCRIPTION OF THE ILLUSTRATED EMBODIMENT

Figure 1:
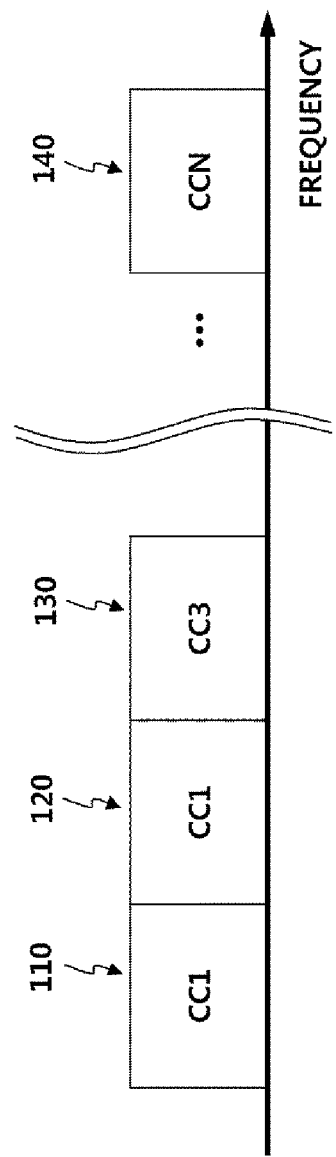
FIG. 1 is a diagram illustrating an example of configuring a plurality of component carriers (CCs)

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The specifications will describe a wireless communication system as an example, and operations performed in wireless communication may include all operations performed in a system that manages the wireless communication and a wireless communication device that transmits data. The wireless communication system may provide various communication services such as voice data, packet data, and the like. According to an embodiment, the wireless communication system may include, for example, a user equipment (UE) and an evolved Node-B (eNB).

The UE may be an inclusive concept indicating a user terminal utilized in a wireless communication, including a UE in Wideband Code Division Multiple Access (WCDMA), Long Term Evolution (LTE), High Speed Packet Access (HSPA), and the like, and a mobile station (MS), a user terminal (UT), a subscriber station (SS), a wireless device and the like in Global System for Mobile Communications (GSM).

The eNB or a cell may refer to a fixed station where communication with the UE is performed, and may also be referred to as a Node-B, a base transceiver system (BTS), an access point, and the like.

The eNB or the cell may be construed as an inclusive concept indicating a portion of an area covered by a radio network controller (RNC) in WCDMA, and the like, and the concept may include various cell coverage areas, such as a megacell, macrocell, a microcell, a picocell, a femtocell, and the like.

In the specifications, the UE and the eNB are used as two inclusive transceiving subjects to embody the technology and technical concepts described in the specifications, and may not be limited to a predetermined term or word.

A multiple access scheme applied to the wireless communication system may not be limited. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), Orthogonal Frequency Division Multiple Frequency Division Multiple Access (OFDM-FDMA), Orthogonal Frequency Division Multiple Time Division Multiple Access (OFDM-TDMA), Orthogonal Frequency Division Multiple Code Division Multiple Access (OFDM-CDMA), and the like. Uplink (UL) transmission and downlink (DL) transmission may be performed based on a time division duplex (TDD) scheme that performs transmission based on different times, or based on a frequency division duplex (FDD) scheme that performs transmission based on different frequencies.

An embodiment of the present invention may be applicable to an asynchronous wireless communication scheme that is advanced through GSM, WCDMA, and HSPA, to be LTE and LTE-advanced, and may be applicable to a synchronous wireless communication scheme that is advanced through CDMA and CDMA-2000, to be UMB. Embodiments of the present invention may not be limited to a specific wireless communication scheme, and may be applicable to all technical fields to which a technical idea of the present invention is applicable.

FIG. 1 illustrates an example of a wireless communication system that uses a plurality of CCs according to an embodiment of the present invention.

Referring to FIG. 1, the wireless communication system may be a next generation communication system, including an LTE system and an LTE-A system.

The LTE/LTE-A system may extend a bandwidth to satisfy a high data transmission rate corresponding to a system requirement, and may use a plurality of component carriers (CCs) which are unit carriers. Here, a single CC may have a maximum bandwidth of 20 megahertz (MHz). Resource allocation may be performed within a bandwidth of 20 MHz depending on a service. However, it is merely an example during a process of embodying a system. Depending on a configuration of a system, a single CC may be configured to have a bandwidth smaller than or equal to 20 MHZ. Also, a plurality of CCs may be bound and used as a single system band, and may be referred to as a carrier aggregation (CA).

As illustrated in FIG. 1, when five CCs having a maximum bandwidth of 20 MHz are used, a bandwidth may be expanded up to 100 MHz to support a quality of service. In this example, an allocable frequency band, which may be determined by each CC, may be contiguous or non-contiguous based on a scheduling of the CA.

Throughout the specifications, a component carrier may be denoted by a CC and may be distinguished by names, for example, CC0, CC1, and the like. However, a number included in a name of each CC may not always match an order of a corresponding CC or a to location of a frequency band of the corresponding CC.

Referring to FIG. 1, the CA may be configured to include a first CC (CC1) 110, a second CC (CC2) 120, a third CC (CC3) 130, and an $N^{th}$ CC (CCN) 140. A UL and a DL allocated to each CC may be different from each other, or may be the same as one another based on a scheduler.

In a wireless communication environment, an electric wave may experience a propagation delay while the electric wave is transferred from a transmitter to a receiver. Accordingly, although both the transmitter and the receiver are accurately aware of a time when the electric wave is transmitted from the transmitter, a time when the electric wave is received by the receiver may be affected by a distance between the transmitter and the receiver, an ambient propagation environment, and the like, and may vary over time when the receiver moves. When the receiver is not accurately aware of a point in time when a signal transmitted from the transmitter is to be received, the receiver may fail to receive the signal, or may receive a signal distorted due to the propagation delay and may fail to perform communication.

Accordingly, in the wireless communication system, synchronization between the eNB and the UE may be established first to receive a signal, irrespective of a UL and a DL. That is, a synchronization process is an essentially important process in a communication system, and maintaining the synchronization process may also significantly affect a stability of the system and a quality of communication.

There may be various types of synchronization, such as a frame synchronization, an information symbol synchronization, a sampling period synchronization, and the like. The sampling period synchronization may need to be obtained basically, so as to distinguish a physical signal.

In DL transmission corresponding to a communication link of transmission in a direction from the eNB to the UE, synchronization may be obtained in the UE based on a signal of the eNB. The eNB may transmit a predetermined signal that is mutually prearranged, so that the UE may readily obtain a DL synchronization, and the UE may need to accurately distinguish a time when the predetermined signal is transmitted from the eNB. In a case of a DL, a single eNB may simultaneously transmit the same synchronization signal to a plurality of UEs and thus, each UE may independently obtain synchronization based on the synchronization signal.

Conversely, in a case of a UL, the eNB may receive signals transmitted from the plurality of UEs and thus, the eNB may have difficulty in obtaining synchronization based on one of the UEs. Accordingly, a synchronization process that is different from the DL may be required.

When distances between the UEs and the eNB are different from each other, the UEs may have different transmission delay times. When each UE transmits UL information based on a corresponding DL synchronization, information transmitted from each UE may be received by the eNB at different times.

Although the uplink information transmitted from each UE is received at different times, the information may be received with a complexity being increased when a transmission scheme adopted by the wireless communication system, such as CDMA, is capable of separately receiving the information. However, in a wireless communication system that is based on OFDMA or FDMA, uplink transmission information of all the UEs may be simultaneously received by the eNB and may be demodulated and thus, a reception performance may increase as the uplink transmission information is received at an accurate time, and a reception performance may be rapidly deteriorated as a reception time difference of each UE signal received in the eNB is increased.

Accordingly, in a wireless communication system that utilizes OFDMA or SC-FDMA as a UL transmission scheme, such as LTE, a timing alignment value may be calculated for each UE based on a random access scheme and the like, to obtain a transmission delay time in a DL and a transmission delay time in a UL, and each UE may be informed of the calculated TA value, so that a UL synchronization is obtained.

Figure 2:
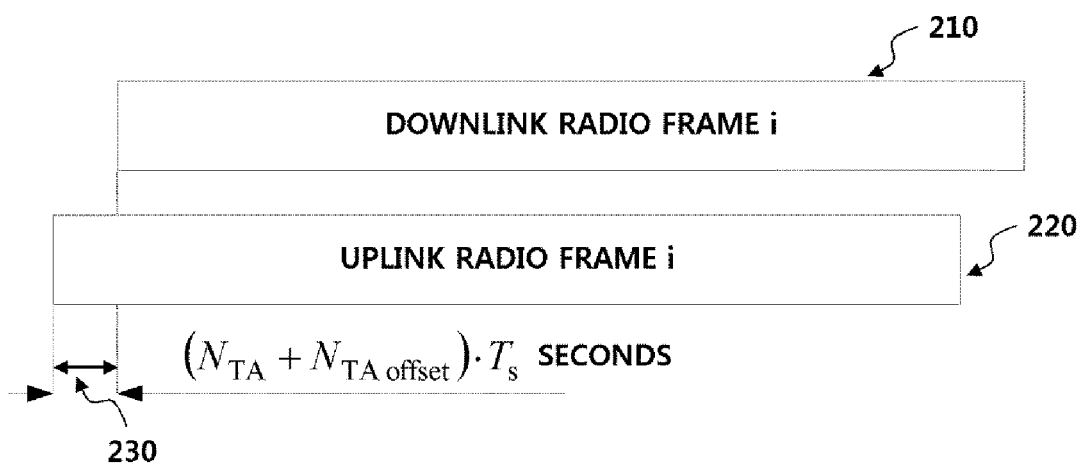
FIG. 2 is a diagram illustrating an example associated with a timing advance (TA) of a synchronization process.

FIG. 2 illustrates an example associated with a timing advance (TA) in a synchronization process according to an embodiment of the present invention.

In general, a UL radio frame i 220 may need to be transmitted at the same point in time as a point in time when a DL radio frame i 210 is transmitted, so as to perform communication between an eNB and a UE. However, a time difference may exist between the UE and the eNB due to propagation delay and the like.

Accordingly, a TA may be applied to enable the UE to transmit the UL radio frame i 220 a little earlier than the DL frame i 210 by taking the propagation delay into consideration, so that synchronization between the eNB and the UE may be obtained. An equation to calculate the TA may be expressed by Equation 1.

$$TA=(N_{TA}+N_{TA\ offset})\cdot T_s \text{ seconds} \quad [\text{Equation 1}]$$

Here, $N_{TA}$ denotes a value to be variable based on TA command information transmitted from the eNB, and $N_{TAoffset}$ denotes a value set based on a frame structure. $T_s$ denotes a sampling period. As shown in FIG. 2, to obtain a UL synchronization, the UE may receive the TA command information provided by the eNB, and may proceed with a TA based on the received TA command information so that UE may obtain synchronization with the eNB for wireless communication.

Figure 3:
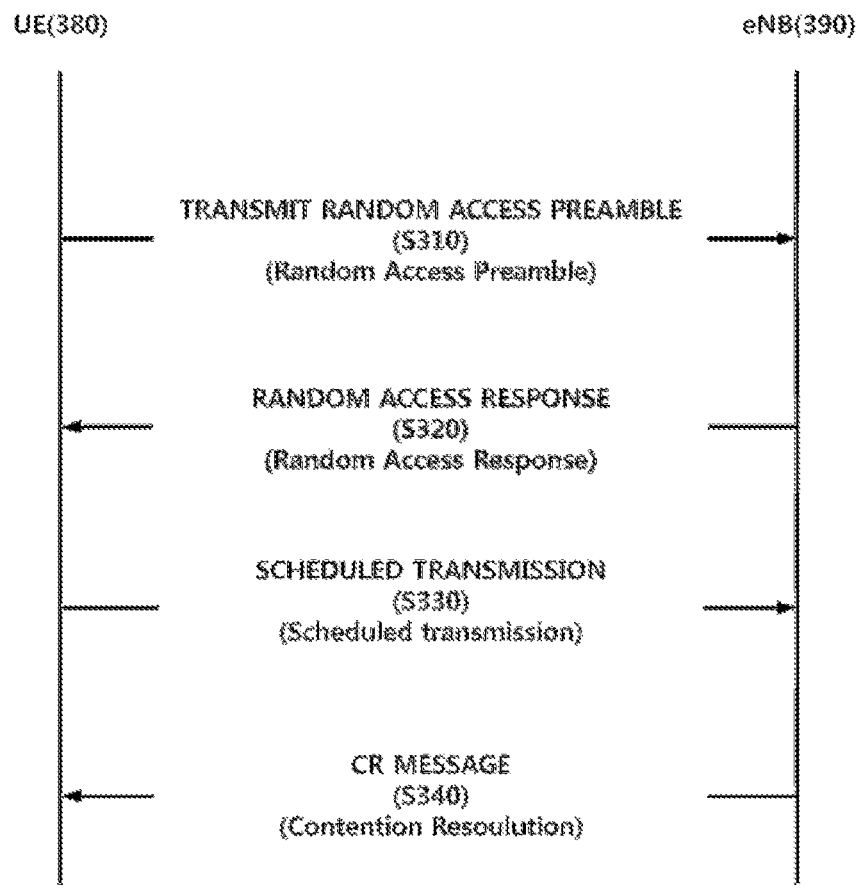
FIG. 3 is a diagram illustrating a random access process performed between a user equipment (UE) and an evolved Node-B (eNB)

FIG. 3 illustrates a random access process performed between a UE and an eNB according to an embodiment of the present invention.

To perform transmission and reception of data with an eNB 390, a UE 380 may need to obtain a UL synchronization. To obtain the UL synchronization, the UE 380 may proceed with a process of receiving information required for synchronization, from the eNB 390. FIG. 3 shows a random access procedure for receiving information required for synchronization. The random access procedure may be applicable when a UE is newly coupled to a network through a handover and the like. Also, upon completing the coupling, the UE may proceed with the random access procedure even under a circumstance such as synchronization, a state change, for example, from an RRC_IDLE to an RRC_CONNECTED, and the like.

The UE 380 may randomly select a preamble signature so as to generate a random access preamble (RAP). Subsequently, the UE 380 may transmit the selected preamble to the eNB 390 (step S310). The process of selecting the preamble signature may be contention-based selection or contention-free selection. In this example, the eNB may inform the UE of a previously reserved RAP, and the UE may transmit, to the eNB 390, a preamble selected based on received information (step S310). Also, according to the contention-free selection, a procedure associated with a contention resolution (CR) message, which is required in the contention-based selection, may not need to be performed.

Here, the UE 380 may recognize random access-radio network temporary identifier (RA-RNTI) based on a transmission time and a frequency resource temporarily selected for selecting a preamble or for random access channel (RACH) transmission.

The eNB 390 may perform random access response (RAR) with respect to the preamble received from the UE 380. In this example, the eNB 390 may transmit an RAR message through a physical downlink shared channel (PDSCH).

Information transmitted through the RAR message may include, for example, identification information of the UE preamble received by the eNB, an identifier (ID) of the eNB, a temporary cell radio network temporary identifier (C-RNTI), information associated with a time slot where the preamble is received, TA information, and the like. Timing information for a UL synchronization may be received through the RAR message and thus, the UE 380 may perform the UL synchronization with the eNB 390. The UE 380 may perform a scheduled transmission that transmits data at a scheduled time determined based on the TA information received in step S320 (step S330). In this example, the UE 380 may transmit synchronized data through a physical uplink shared channel (PUSCH), and may perform hybrid automatic repeat request (HARQ).

Examples of a message transmitted in step S330 may include a radio resource control (RRC) connection request, a tracking area update, a scheduling request, and the like. Also, one of the messages may include a temporary C-RNTI, a C-RNTI (if the UE already has one), UE identification information, and the like.

In steps S310 through 330, collision may occur and thus, when the eNB 390 transmits a CR message (step S340), the UE 380 may i) determine whether a received message corresponds to the UE 380, and may transmit an acknowledgement (ACK) when the received message corresponds to the UE 380 or ii) may not transmit response data when the received message corresponds to another UE. Also, the UE 380 may not transmit the response data when the UE 380 misses DL allocation or fails to decode the message. Also, the CR message may include a C-RNTI, UE identification information, and the like.

Unlike a process of obtaining a TA when a single carrier is utilized, in a wireless system that uses a plurality of CCs, TA values of the CCs may have a high probability of being different from each other when locations of center frequencies of the CCs are significantly distant from each other as shown in FIG. 1, when the CCs are supported by different devices in a network, or the like.

Accordingly, when a synchronization obtaining scheme used for a single carrier is applied as is, the CCs may have difficulty in obtaining the UL synchronization for the CCs. Accordingly, the UE may perform stable UL communication for a few CCs that obtain UL synchronization from among available CCs.

When the UE transmits, based on the same UL synchronization standard, information through CCs of which UL synchronization standards are different from each other, a probability of transmission error may be significantly high, and a time and resources for restoring the error may be wasted. In this example, it is difficult to satisfy a UL quality of service (QoS) for an application program required by a system.

When the wireless communication uses a plurality of CCs, a transmission delay time may be different in a DL based on a supporting scheme in a radio network and a characteristic of each CC with respect to a single UE. Accordingly, when CCs or CCs having the same TA value are configured as a set, a UL synchronization standard may be different for each CC set and thus, UL performance may be deteriorated.

Therefore, embodiments of the present invention for a wireless communication system supporting a plurality of CCs, are provided so that the UE obtains a UL synchronization of a corresponding CC or a group of CCs based on a type of each CC, a location of a center frequency, a network service type, and the like when CCs or groups including at least one CC have different UL synchronization standards.

Hereinafter, a user terminal may be referred to as a UE and a base station may be referred to as an eNB.

Figure 4:
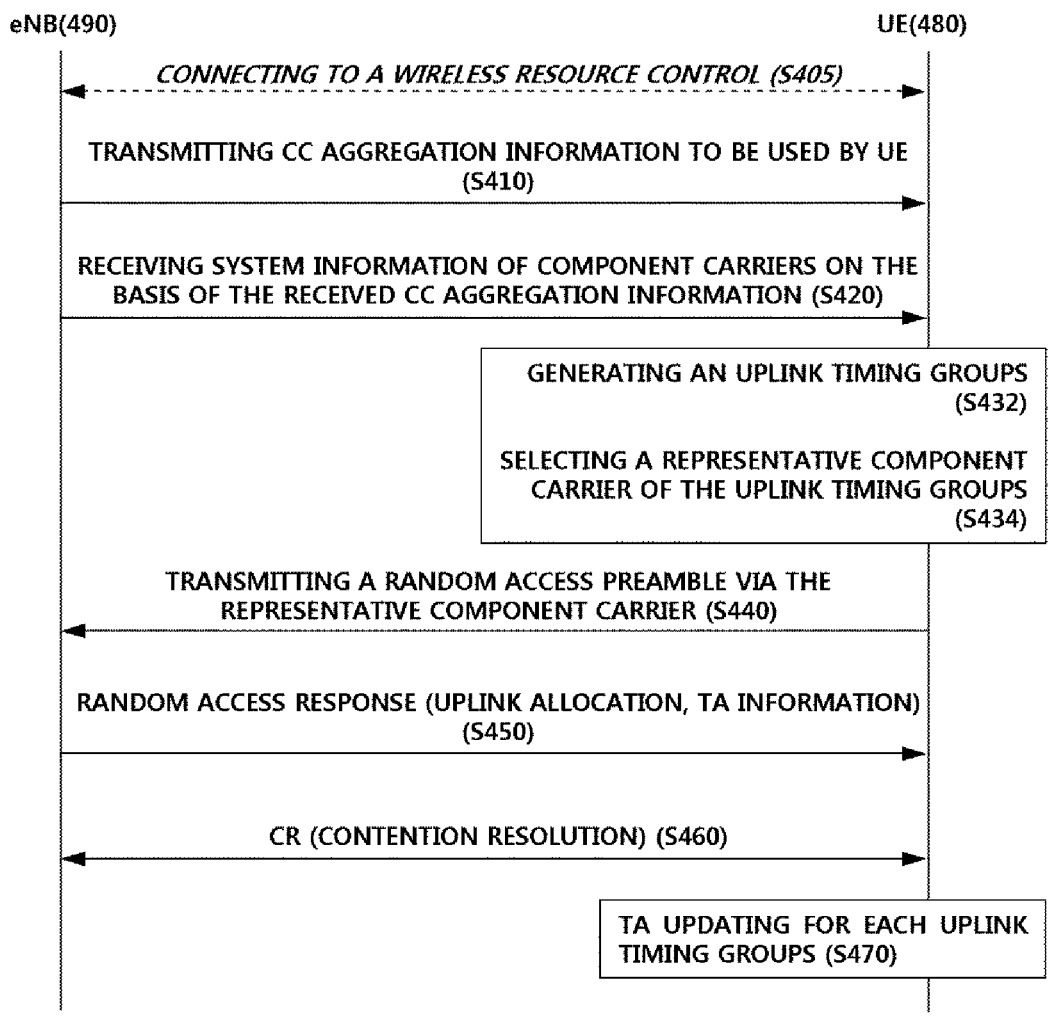
FIG. 4 is a diagram illustrating a process that obtains an uplink (UL) synchronization according to an embodiment of the present invention.

FIG. 4 illustrates a process that obtains a UL synchronization according to an embodiment of the present invention.

FIG. 4 shows a process in which a UE configures a group associated with a timing from among a plurality of CCs and performs RAP through a delegate CC when an eNB transmits information associated with the CCs to the UE.

Referring to FIG. 4, when an RRC connection mode is an RRC_CONNECTED mode indicating that a UE 480 and an eNB 490 are connected, step S410 may be performed. When the RRC connection mode is an IDLE mode or requires resetting, step S405 may be performed first, and then step S410 may be performed.

In step S405, RRC connection may be performed. When the RRC connection mode between the eNB 490 and the UE 480 is the IDLE mode or requires resetting, the eNB 490 may have difficulty in defining a CC set of the corresponding UE and transmitting CC set information in the IDLE mode UE. Therefore, the CC set information may be formed by selecting at least one CC to perform RRC connection so that the RRC connection is performed (step S405). At least one CC to perform the RRC connection may be selected based on one of the following methods.

i) select a CC that is most appropriate for attempting RRC connection based on information measured by the UE 480 ii) attempt RRC connection based on information fixedly set in a system and stored in an internal memory of the UE 480 iii) attempt RRC connection based on information transmitted to the UE 480 from the eNB 490 through system information iv) attempt RRC connection through CCs corresponding to system information of the available CCs stored in an internal memory of the UE 480

For example, a UE in an IDLE mode may select a single DL CC for the RRC connection based on the conditions, and may receive system information via a broadcasting channel that is transmitted through the selected CC. Based on the received system information, the selected DL CC and a UL CC having a linkage with the DL CC may be configured as a primary serving cell (PCell). The UE may transmit, to an eNB, an RRC connection request message through the PCell. In this example, the UE may transfer the RRC connection request message to the eNB through an RACH procedure.

Here, the DL CC corresponding to the PCell may be referred to as a DL primary CC (DL PCC), and the UL CC corresponding to the PCell may be referred to as a UL primary CC (UL PCC). Also, a CC corresponding to a secondary serving cell (SCell) 920 in a DL may be referred to as a DL secondary CC (DL SCC), and a CC corresponding to the SCell in a UL may be referred to as a UL secondary CC (UL SCC).

The PCell and the SCell have characteristics as follows.

First, the PCell may be used for PUCCH transmission.

Second, the PCell is always activated, whereas the SCell 920 is activated or deactivated based on a predetermined condition.

Third, when the radio link failure (RLF) is detected via PCell, RRC reconnection PCell may be triggered. When the RLF is detected via SCell 920, RRC reconnection on SCell may not be triggered.

Fourth, the PCell may be changed by a change of a security key or by a handover procedure accompanying the RACH procedure. In a case of an MSG4 (contention resolution), only a PDCCH that indicates the MSG4 may be transmitted through the PCell, and MSG4 information may be transmitted through the PCell or the SCell.

Fifth, non-access stratum (NAS) information may be received through the PCell.

Sixth, the PCell may be configured as a pair of a DL PCC and a UL PCC.

Seventh, each UE sets a different CC as the PCell.

Eighth, a procedure such as, reconfiguration, adding, and removal of the SCell may be performed by an RRC layer. To add a new SCell, RRC signaling may be used to transmit system information associated with a dedicated SCell.

Technical concept of the PCell and the SCell in embodiments of the present invention may not be limited to the descriptions provided in the foregoing, and may include further examples.

When RRC connection setup is completed through one of the methods, and the RRC connection mode between the eNB 490 and the UE is the RRC_CONNECTED mode, step S410 may be performed.

The eNB 490 may allow the UE 480 to use a plurality of CCs based on a performance of hardware of the UE 480, available frequency resources of the eNB 490, and the like, and may define the plurality of CCs to be a CC set. The eNB 490 may transmit, to the UE 480, CC set information associated with the CC set that is allowed to the UE 480 (step S410).

As described in the foregoing, the UE 480 and the eNB 490 maintain the RRC_CONNECTED mode from step S405 or before. That is, a UL synchronization of a UL CC through which the RRC connection of the UE 480 is set up is maintained. The UE 480 may receive the CC set information determined based on the above condition, from the eNB 490.

According to a scheme of transmitting and receiving the CC set information, the eNB 490 may include the CC set information in an RRC reconfiguration message for transmission to the UE 480, or may use another message for transmission.

Also, the CC set information may be configured by adding/removing each CC. For example, when initial CC set information is transmitted, the CC set information configured of DL CC1, DL CC2, and DL CCN may be configured as an added DL CC list and the list may include CC1, CC2, and CCN. In the same manner, UL CC set information may be configured as an added UL CC list.

As another example, when the CC set information is changed, that is, when the configured DL CC set is changed into CC1, CC3, and CCN, the DL CC set information may be transmitted by configuring CC2 as a removed DL CC list and CC3 as an added DL CC list.

The UE 480 may receive system information (SI) associated with CCs in the CC set, based on the received CC set information (step S420).

When a CC that is incapable of transmitting SI to a corresponding CC exists from among the CCs in the CC set, for example, an extension CC (ECC), or a CC that is incapable of receiving SI transmitted via a broadcasting channel (for example, a DL CC that belongs to an SCell) exists, the SI may be received by a CC that is capable of receiving the SI or may be received by a CC that is capable of receiving SI that is transformed in a form of control information.

The transformed SI may be transmitted to the UE together with the CC set information included in the RRC reconfiguration message transmitted by the eNB, or may be transmitted to the UE through the RRC reconfiguration message after the CC set information is received. Also, the current stage may be performed without receiving the SI associated with the corresponding CC.

The UE 480 may configure a UL timing group including CCs in the CC set as elements of the UL timing group, based on the received SI (step S432). When the UL timing group is configured, considerations may be as follows.

First, whether a plurality of CCs is assigned to different groups may be determined based on the following conditions. That is, a CC that satisfies at least one of the conditions may be configured to be a different group.

a-i) CCs of which a difference in center frequency values is greater than or equal to a threshold, are assigned to different groups. When a difference in the center frequency values is high, delay occurring in a wireless signal propagation process may be changed and thus, a difference in TA values may also increase.

a-ii) CCs to which different beamforming schemes are applied are assigned to different groups. TA values are highly likely to be different from each other when the beamforming schemes are different from each other.

a-iii) CCs that are set to be updated every time a UL synchronization update request exists are assigned to different groups. The setting may be included in SI set by the eNB 490 for transmission, or may be included in other messages for transmission.

a-iv) CCs that do not provide services in a macrocell or CCs that provide services in a space superposed on the macrocell by a femtocell, a picocell, a microcell, a relay, a repeater, and the like may have different characteristics from CCs that provide services by the macrocell and thus, the CCs are configured to be different groups.

a-v) a CC that has a UL synchronization update request from the eNB 490 may be a CC that has a changed synchronization and thus, the CC may be assigned to a different group.

As described in the foregoing, examples of a condition for setting CCs to be a UL timing group may be a-i) through a-v). In addition, CCs are configured to be a single group or to be different groups based on a wireless propagation characteristic, a predetermined measurement value, and the like.

When one of the following conditions are satisfied, CCs may be configured to be a single group.

b-i) CCs of which a difference in center frequency values is within a threshold range may have similar propagation characteristic and thus, the CC may be configured to be a single group.

b-ii) CCs to which the same beamforming scheme is applied may be configured to be a single group b-iii) CCs used in devices in the same radio network may be configured to be a single group b-iv) CCs that do not satisfy conditions a-I through a-v for assigning CCs to different groups may be configured to be a single group A method for the UE 480 to generate a group may include two schemes, that is, a scheme of generating groups by distinguishing CCs that belong to different groups and a scheme of generating a group by distinguishing CCs to be included in the same group. The two schemes may be used together or one of the two schemes may be used. Conditions to be used in a process of applying each scheme have been described in the foregoing.

When the UL timing group is generated, the UE 480 may select a delegate CC for each group (step S434). In this example, the delegate CC may be selected based on following conditions, from among CCs that are capable of obtaining a TA value to be used for obtaining a UL synchronization.

c-i) a CC having a lowest center frequency value c-ii) a CC having a center frequency value that is closest to a mean value c-iii) a CC having a highest center frequency value c-iv) a CC having a broadest frequency band c-v) a CC that is set to be used for monitoring DL quality A CC satisfying one of the conditions may be selected as a delegate CC.

Here, a CC may be defined to include a DL CC or both the DL CC and a UL CC, and may be defined to be a cell or a serving cell. In other words, the cell may be defined by only DL frequency resources (for example, a CC) through which a wireless signal recognized by a UE reaches a predetermined area, and may be defined to be a pair of the DL frequency resources that is used by the UE to receive a signal from the eNB and UL frequency resources that is used by the UE to transmit a signal to the eNB.

Therefore, with respect to only a UE that is able to form a plurality of CCs, the eNB may be able to form a plurality of serving cells to perform transmission and reception of data with the UE In this example, a PCell may indicate a single serving cell that provides a security input and NAS mobility information in an RRC establishment state or re-establishment state. Also, based on the capabilities of the UE, at least one cell may be configured to form a serving cell set with the PCell, and the at least one cell may be referred to as an SCell.

Accordingly, a serving cell set configured for a single UE may be configured of a single PCell or of a single PCell and at least one SCell. An adjacent cell in a frequency of the PCell and/or an adjacent cell in a frequency of the SCell may be in the same carrier frequency, and adjacent cells in frequencies of the PCell and the SCell may be in different carrier frequencies.

Here, a CC set for monitoring the DL quality may include an SCell to which a radio link monitoring (RLM) is defined. In particular, the RLM may include a process in which a UE monitors DL quality based on a cell-specific reference (CRS) signal so as to detect DL quality of a serving cell set between the UE and an eNB.

In this example, the UE may predict the DL quality based on predetermined parameters which are defined by a ratio of the measured CRS to energy of control channels.

The RLM may be set based on following conditions. To predict the DL quality through the RLM, a value that expresses a ratio of reception energy of an RE (single sub-carrier in a single OFDM symbol) through which a PDCCH/physical control format indicator channel (PCFICH) is transmitted, to an average RE energy of the CRS based on a dB unit may be used as a criterion.

From among the parameters, a parameter $Q_{out}$ that is a criterion to determine an out-of-sync state may be configured based on a parameter set for transmitting a PDCCH/PCFICH and a value of which a block error rate (BER) of hypothetical PDCCH (based on a DCI format 1A) transmission based on an error of the PCFICH is greater than or equal to 10%. The value may be changed based on a number of antenna ports through which the CRS is transmitted.

For example, when the CRS is transmitted through a single antenna port, a ratio of energy between the PDCCH and the CRS to be determined as $Q_{out}$ may be based on 4 dB, and when the CRS is transmitted through two or more antenna ports, $Q_{out}$ may be based on 1 dB. From among the parameters, a parameter $Q_{in}$ that is a criterion to determine synchronization restoration or in-sync state may be determined based on a value having a sufficiently large reliability when compared to $Q_{out}$.

That is, a parameter set for transmitting the PDCCH/PCFICH and a value of which a BER of hypothetical PDCCH (based on a DCI format 1C) transmission based on an error of the PCFICH is greater than or equal to 2% may be used. The value may be changed based on a number of antenna ports through which the CRS is transmitted.

For example, when the CRS is transmitted through a single antenna port, a ratio of energy between the PDCCH and the CRS to be determined as $Q_{in}$ may be based on 0 dB, and when the CRS is transmitted through two or more antenna ports, $Q_{in}$ may be based on −3 dB.

A reason that an energy ratio used for determining $Q_{in}$ is lower than $Q_{out}$ is that the energy ratio is based on the parameter set for transmitting the PDCCH/PCFICH and the BER of the hypothetical PDCCH transmission. The parameters set for transmitting the PDCCH/PCFICH may include a DCI format of a PDCCH, a number of OFDM symbols through which control information of a subframe is transmitted, an aggregation level indicating a self-duplication rate of the PDCCH, and the like. The parameters may be affected by a bandwidth of a DL. $Q_{out}$ and $Q_{in}$ may be affected based on whether a UE performs discontinuous reception (DRX) with respect to a corresponding cell.

Therefore, the UE or the eNB may select a delegate CC in each group. In this example, the UE or the eNB may select the delegate CC by selecting an SCell including the delegate CC. In this example, the delegate CC or the SCell may be selected based on the conditions c-i) through c-v), from among CCs that are capable of obtaining a TA value to be used for obtaining a UL synchronization. That is, one of the c-i) through c-v) may be selected as a delegate CC.

In this example, according to a method of selecting a delegate CC for each UL timing group, the same criterion may be used for all groups or a different criterion may be used for each timing group. That is, the delegate CC may be selected based on a network state of each group, characteristics of CCs forming each group, and the like.

After completing steps S432 and S434 for setting a UL timing group and a corresponding delegate CC, to obtain a UL synchronization, the UE 480 may set an RAP through a delegate CC of each group, and may transmit the set preamble by selecting one of the resources defined in SI of each CC (step S440). The preamble may be included in a synchronization request message through which the UE requests synchronization. Transmission of the corresponding preamble may include a case in which the UE 480 sequentially, simultaneously, or randomly transmits a preamble through a selected CC in time/frequency resources set by the eNB 490.

Cases that require obtaining a UL synchronization may be as follows. Although a condition does not satisfy one of the cases described below, when the UE 480 determines that it is required, the UE 480 may generate an RAP and may transmit the RAP to the eNB 490.

d-i) a case in which the eNB 490 requires re-establishment of the entire DL synchronization d-ii) a case that initializes and retries all UL data transmission d-iii) a case in which a time alignment timer of the UE 480 expires The UE 480 may transmit a preamble to be used for obtaining a UL synchronization with respect to total available CC groups.

Also, the UE 480 may need to obtain a UL synchronization with respect to a few available CC groups. Relevant cases will be described as follows.

e-i) a case in which a CC set is initially set and a TA value does not exist in a corresponding group e-ii) a case in which a response is not obtained in response to UL transmission data transmitted through CCs in a group of the UE 480 e-iii) a case in which an RRC connection between the eNB 490 and the UE 480 is reconfigured e-iv) a case in which the UE 480 performs handover of a predetermined CC group to an eNB 490 that is physically different from the UE 480 e-v) a case in which the eNB 490 requests reconfiguration with respect to a predetermined CC group associated with a DL synchronization.

e-vi) a case in which a CC time alignment timer expires (the timer is set for each CC or for each group). When a condition satisfies one of the cases, a process for obtaining a UL synchronization with respect to a CC group including a corresponding CC may be performed.

For example, in steps S432 and S434, CC1, CC2, CC3, CC4, and CC5 exist, and CC1 and CC2 are configured to be group 1, and CC3, CC4, and CC5 are configured to be group 2. A delegate CC of group 1 is CC1, a delegate CC of group 2 is CC3. In this example, when a UL synchronization for the total available CC groups is required, the UE 480 may transmit an RAP through CC1 and CC3. When synchronization needs to be obtained for a few CC groups, that is, when synchronization needs to be obtained for group 2, the UE 480 may transmit an RAP through CC3.

When a UL synchronization needs to be re-established while data is transmitted through a UL, the UE 480 may perform the following operation first, for example, initializing UL data transmission, and then may perform initializing HARQ buffers, releasing a physical uplink control channel (PUCCH)/releasing sounding reference signal (SRS), initializing semi-persistent scheduling allocation/allowance, and the like, as a procedure to obtain a UL synchronization.

The eNB 490 may calculate a TA value for each group with respect to each CC group (each delegate CC) based on the received RAP signal. The eNB 490 may transmit, to the UE 480, UL grant information and a TA value of a UL timing group (a delegate CC) through an RAR message (step S450). The TA value may be an example of UL synchronization information required when the UE adjusts a UL transmission time.

Subsequently, when the UE 480 determines that the TA value received in a CR procedure (step S460) is valid, the UE 480 may apply the TA value to another CC in the group for updating (step S470).

As described in the foregoing, when a procedure of obtaining a UL synchronization is performed with respect to all the groups, TA values associated with CC1 and CC3 may be applied to CCs each included in group 1 and group 2. When a TA value of CC3 is received for group 2, the TA value may be applied to CCs included in group 2.

Figure 5:
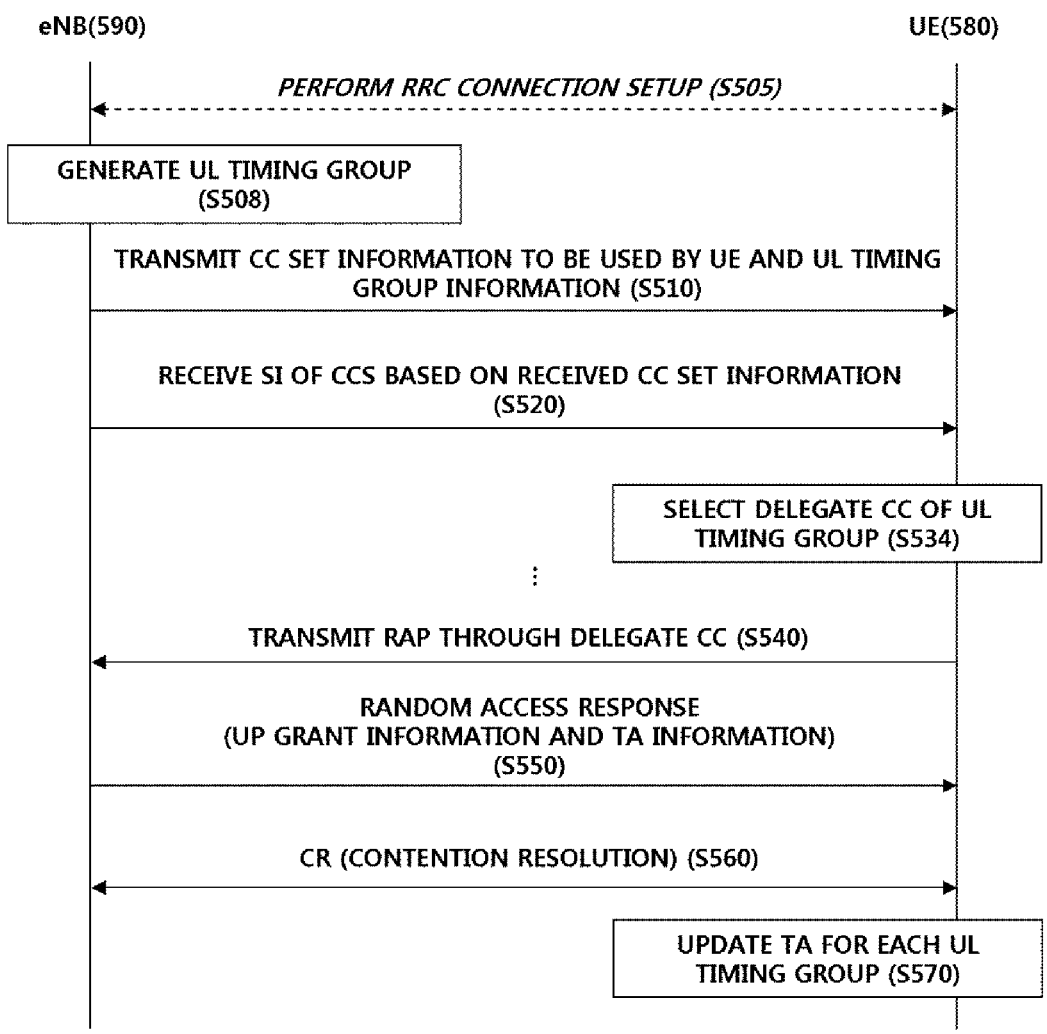
FIG. 5 is a diagram illustrating a process that obtains a Up Link (UL) synchronization according to another embodiment of the present invention.

FIG. 5 illustrates a process that obtains a UL synchronization according to another embodiment of the present invention. Here, FIG. 5 shows that an eNB 590 configures a UL timing group.

Referring to FIG. 5, the eNB 590 determines a mode (RRC_CONNECTED/RRC_IDLE) of a UE before transmitting UL timing information. When the eNB 590 is not connected to the UE, the eNB 590 may proceed with RRC connection (step S505), and may use a PCell for RRC connection, which will be performed in the same manner as step S405 of FIG. 4.

A scheme of generating a group in the eNB 590 may be performed based the conditions a-i) through a-v) or b-i) through b-iv) of FIG. 4.

Accordingly, the eNB 590 may transmit CC set information of the UE 580 and UL timing group information of the set UL timing group to the UE 580 (step S510). Here, the UL timing group information may be included in a CC set information message for transmission to the UE 580, or a separate other message may be used for transmission. A case that uses a separate message will be described with reference to FIG. 6. The CC set information message provided for each UE may be an RRC (L3) message, an L1 signaling, or an L2 signaling.

The UE 580 may receive SI of CCs in a set, based on the received CC set information (step S520). In this example, the UE 580 may use the UL timing group generated by the eNB 590 in step S508 as it is, or may slightly change the UL timing group based on a current network state as shown in step S432 of FIG. 4. This may indicate that the UE 580 may change the UL timing group when the UL timing group generated by the eNB 590 is inappropriate for an environment of the UE 580.

That is, after receiving a UL timing group or after changing or newly generating a UL timing group, the UE 580 may select a delegate CC for each UL timing group (step S534). The conditions taken into consideration when a delegate CC is selected for each UL timing group have been described in step S434 of FIG. 4.

After completing selection of a delegate CC for each UL timing group in step S534, when a UL synchronization needs to be obtained, the delegate CC in each group may set an RAP, and may transmit the selected preamble by selecting one of the resources defined in SI of each CC (step S540). The preamble may be included in a synchronization request message through which the UE requests synchronization.

Here, the UE 580 may transmit an RAP transmit message and the like for obtaining the UL timing information. Also, the corresponding preamble may be sequentially, simultaneously, or randomly selected and transmitted by the UE 580 in time/frequency resources set by the eNB 590.

A case that requires the UE 580 to obtain a UL synchronization may be associated with conditions d-i) through d-iii). Also, the UE 580 may transmit a preamble to obtain a UL synchronization with respect to available total CC groups. The UE 580 may need to obtain a UL synchronization with respect to a few available CC groups.

The eNB 590 may calculate a TA value for each group with respect to each CC group (each delegate CC) based on the received RAP signal, and may include the corresponding TA value together with UL grant information in RAR information for transmission to UE 580 (step S550). The TA value may be an example of UL synchronization information required when the UE adjusts a UL transmission time.

For example, the eNB 590 may calculate a TA value based on the UL timing group set in step S508, and may transmit the calculated TA value. Also, the eNB 590 may transmit the RAR message through a predetermined CC, and may transmit the RAR message through all CCs in the corresponding UL timing group.

When the UE 580 determines that a TA value received in a CR procedure (step S560) is valid, the UE 580 may apply the TA value to remaining CCs in a group so as to update a TA value for each UL timing group (step S570).

Figure 6:
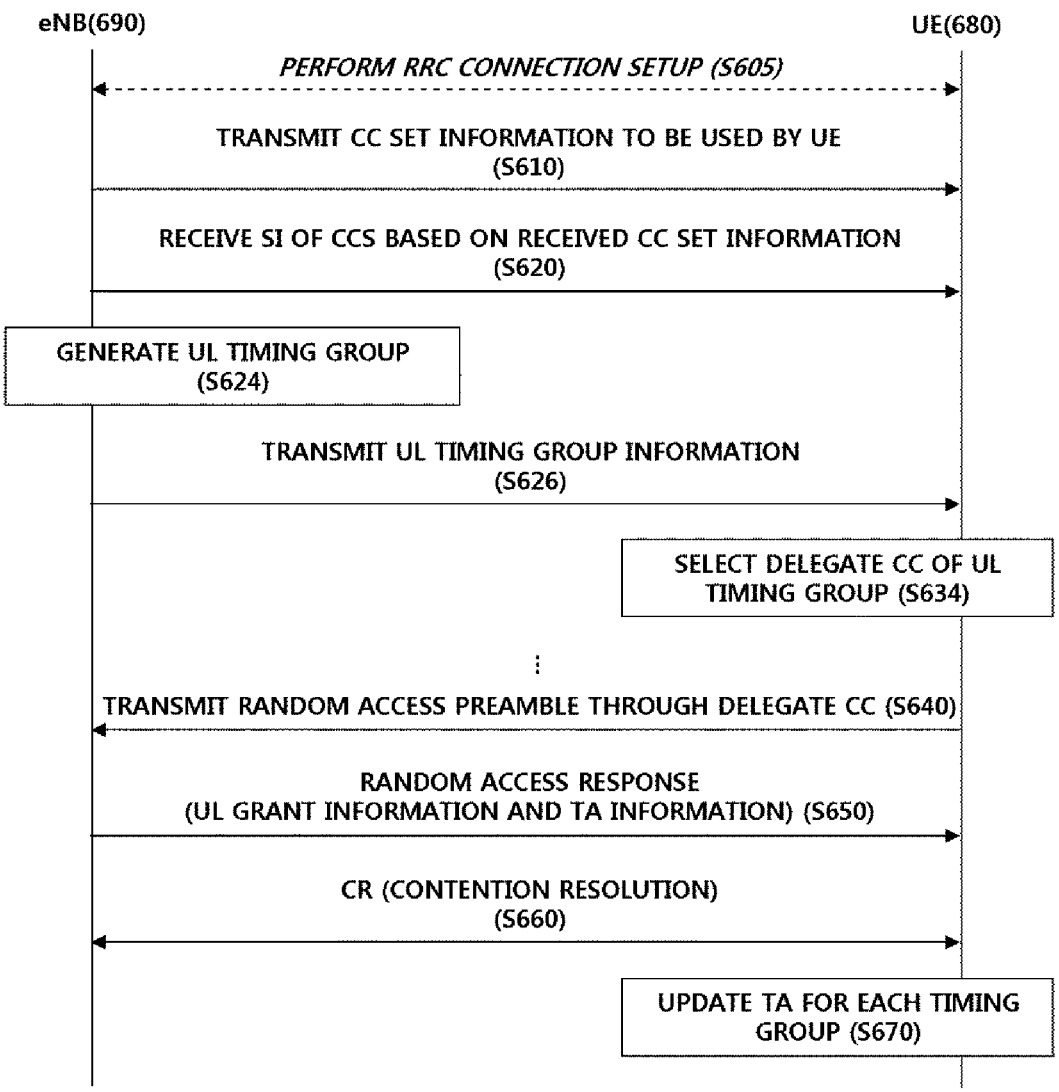
FIG. 6 is a diagram illustrating a process that obtains a UL synchronization according to still another embodiment of the present invention.

FIG. 6 illustrates a process that obtains a UL synchronization according to still another embodiment of the present invention. Here, FIG. 6 shows that an eNB 690 configures a UL timing group and transmits group information through a separate message.

Referring to FIG. 6, the eNB 690 determines a mode (RRC_CONNECTED/RRC_IDLE) of a UE 680. When the eNB 690 is not connected to the UE 680, the eNB 690 may proceed with an RRC connection setup (step S605), and may use a PCell for RRC connection, which will be performed in the same manner as step S405 of FIG. 4 and step S505 of FIG. 5.

The eNB 690 may allow the UE 680 to use a plurality of CCs based on a performance of hardware of the UE 680, available frequency resources of the eNB 690, and the like, and may define the plurality of CCs to be a CC set. The eNB 690 may transmit CC set information of the UE 680 to the UE 680 (step S610). A CC set information message provided for each UE may be a message used for an RRC (L3) message and the like or may be an L1 signaling or an L2 signaling.

As described in the foregoing, the UE 680 and the eNB 690 maintain the RRC_CONNECTED mode from step S605 or before. That is, a UL synchronization of a UL CC through which the RRC connection of the UE 680 is set up is maintained. The UE 680 may receive the CC set information determined based on the above condition, from the eNB 690. As one of the schemes of receiving the CC set information, the eNB 690 may include the CC set information in an RRC reconfiguration message for transmission, and other messages may be used for transmission.

The UE 680 may receive SI of CCs in a set based on the received CC set information (step S620).

The eNB 690 may set a UL timing group with respect to CCs assigned to the UE 580 (step S624). In the process of configuring the UL timing group in the eNB 690, CCs may be configured to be different groups of at least two or to be the same group. The conditions a-i) through a-v) or b-i) through b-iv) may use to set a UL timing group.

A method for the eNB 690 to generate a group may include two schemes, that is, a scheme of generating groups by distinguishing CCs that belong to different groups and a scheme of generating a group by distinguishing CCs to be included in the same group. The two schemes may be used together or one of the two schemes may be used. Conditions to be used in a process of applying each scheme have been described in the foregoing.

The eNB 690 may transmit the UL timing group information to the UE 680 (step S626). The UL timing group information may not be included in the CC set information message and the like for transmission, and The UL timing group information may be transmitted independently with the CC set information through use of a separate message. The UL timing group information may be transmitted through a channel, such as a PDCCH channel, an RRC signaling, and a broadcasting channel, and may be transmitted through an L2 (MAC element control) message.

The UE 680 that receives the CC set information message may use the received UL timing group as it is, or may slightly change the UL timing group based on a current network state. This may include a case in which the UE 680 changes the UL timing group when the UL timing group generated by the eNB 690 is inappropriate for an environment of the UE 680. After receiving the UL timing group or after changing or newly generating the UL timing group, the UE 680 may select a delegate CC for each UL timing group (step S634). The conditions taken into consideration when a delegate CC is selected for each UL timing group have been described in step S434 of FIG. 4, and step S534 of FIG. 5.

After completing selection of a delegate CC for each UL timing group in step S634, when a UL synchronization needs to be obtained, the delegate CC in each group may set an RAP, and may transmit the selected preamble by selecting one of the resources that are allocated for random access and defined in SI of each CC (step S640). The preamble may be sequentially, simultaneously, or randomly selected and transmitted by the UE 680 in time/frequency resources set by the eNB 690. The preamble may be included in a synchronization request message through which the UE requests synchronization.

The eNB 690 may calculate a TA value for each CC group (each delegate CC) based on the received RAP signal, and may include the corresponding TA value together with UL grant information in RAR information for transmission to UE 680 (step S650). For example, the eNB 690 may calculate a TA value based on the UL timing group set in step S624, and may transmit the calculated TA value in advance. Also, the eNB 690 may transmit the RAR message through a predetermined CC, and may transmit the RAR message through all CCs in the corresponding UL timing group. The TA value may be an example of UL synchronization information required when the UE adjusts a UL transmission time.

When the UE 680 determines that a TA value received in a CR procedure (step S660) is valid, the UE 680 may apply the TA value to remaining CCs in a group so as to update a TA value for each UL timing group (step S670).

As described in FIG. 6, the UE 680 may receive a set UL timing group from the eNB 690, and may perform a random access procedure based on a representative value of a corresponding group. Subsequently, the UE 680 may receive a TA value of the timing group based on a preamble associated with the random access procedure, and may adjust a UL timing for obtaining synchronization.

Figure 7:
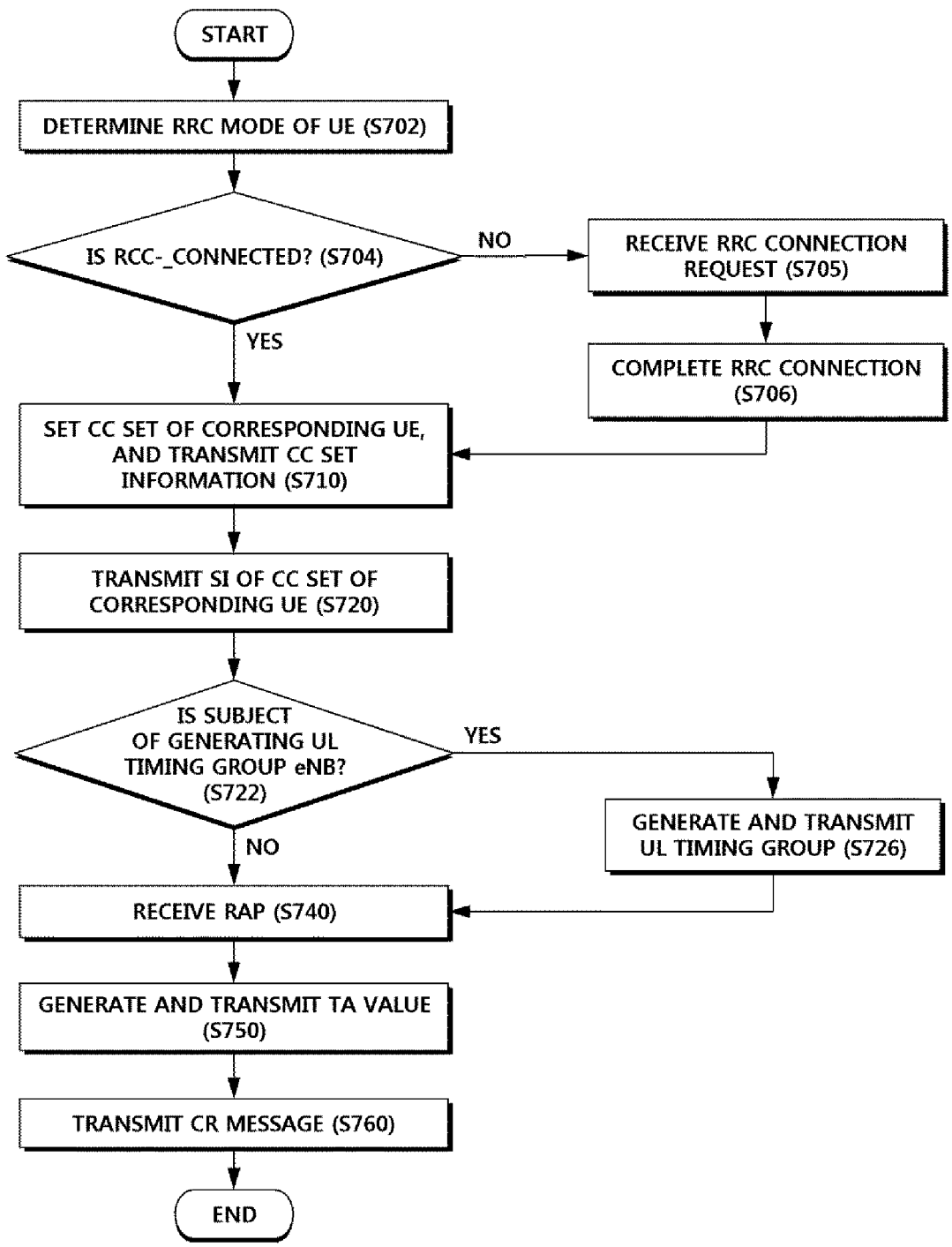
FIG. 7 is a diagram illustrating a process in which an eNB enables the UE to obtain a UL synchronization in response to a request from the UE according to an embodiment of the present invention.

FIG. 7 illustrates a process in which an eNB supports the UE to obtain a UL synchronization in response to a request from the UE according to an embodiment of the present invention.

Referring to FIG. 7, the eNB determines an RRC mode of the UE (step S702). When the RRC mode between the eNB and the UE is an RRC_CONNECTED mode (step S704), the eNB may proceed with step S710.

When the RRC mode is different from the RRC_CONNECTED mode, the eNB may proceed with step S705. The eNB may determine whether an RRC connection request from the UE exists in step S705. The eNB may receive the RRC connection request from the UE (step S705), and may complete RRC connection (step S706). In this example, the eNB may receive an RRC connection request message from the UE, may transmit an RRC connection setup message, and may receive an RRC connection setup complete message from the UE so as to complete RRC connection. As described in steps S405, S505, and S605, a PCell may be used for RRC connection.

The eNB may set a CC set including at least one available CC with respect to an RRC_CONNECTED UE, and may transmit CC set information associated with the CC set to the UE (step S710).

The eNB may transmit SI associated with at least one predetermined CC in the CC set, based on the CC set information of the UE (step S720). Here, the CC set information may be transmitted through an RRC message. Also, the SI of the CC set may be transmitted through a broadcasting channel.

The eNB may determine whether a subject of generating a UL timing group is the eNB (step S722). When the UL timing group is generated by the eNB, the eNB may generate a UL timing group based on the CC set information of the UE, and may transmit information associated with the generated UL timing group to the UE (step S726). Here, the UL timing group information may be generated at the same point in time when the CC set information is generated and transmitted in step S710, or may be transmitted together with the CC set information.

The eNB may receive an RAP from the UE (step S740). The preamble may be included in a synchronization request message through which the UE requests synchronization. Step S740 may include a case in which the subject of generating the UL timing group is the UE. That is, the UE may generate a UL timing group based on available CC set information of step S710 and SI of a corresponding CC of step S720, may set a delegate CC for each timing group, and may transmit an RAP through a corresponding delegate CC. Therefore, the eNB may receive the preamble transmitted from the UE. Here, the eNB may receive a synchronization request message, for example, the preamble, simultaneously through a plurality of delegate CCs, or at separated time, that is, sequentially through a delegate CC for each UL timing group.

Subsequently, the eNB may transmit an RAR message with respect to the received preamble. In this example, the eNB may transmit UL grant information for the UE and TA information for each UL timing group along with the RAR message (step S750).

The TA value may be an example of UL synchronization information required when the UE adjusts a UL transmission time. Also, the TA information for each UL timing group may be transmitted through a plurality of delegate CCs, simultaneously or at separated time. Here, the TA information for each UL timing group may be transmitted in a form of a table including a TA value corresponding to a group index. Also, the TA information for each UL timing group may be transmitted in a form including a unit error for each timing group based on a reference TA value. In this example, the error for each group may be expressed by an integer-multiple of a predetermined unit value, or may be specified in detail. The TA information for each UL timing group may be transmitted in a form of an indicator indicating a TA based on a predetermined rule.

The eNB may transmit a CR message to the UE (step S760). This may include an operation that enables the UE to determine the validity of the received TA value and to update a TA value of a corresponding group.

Figure 8:
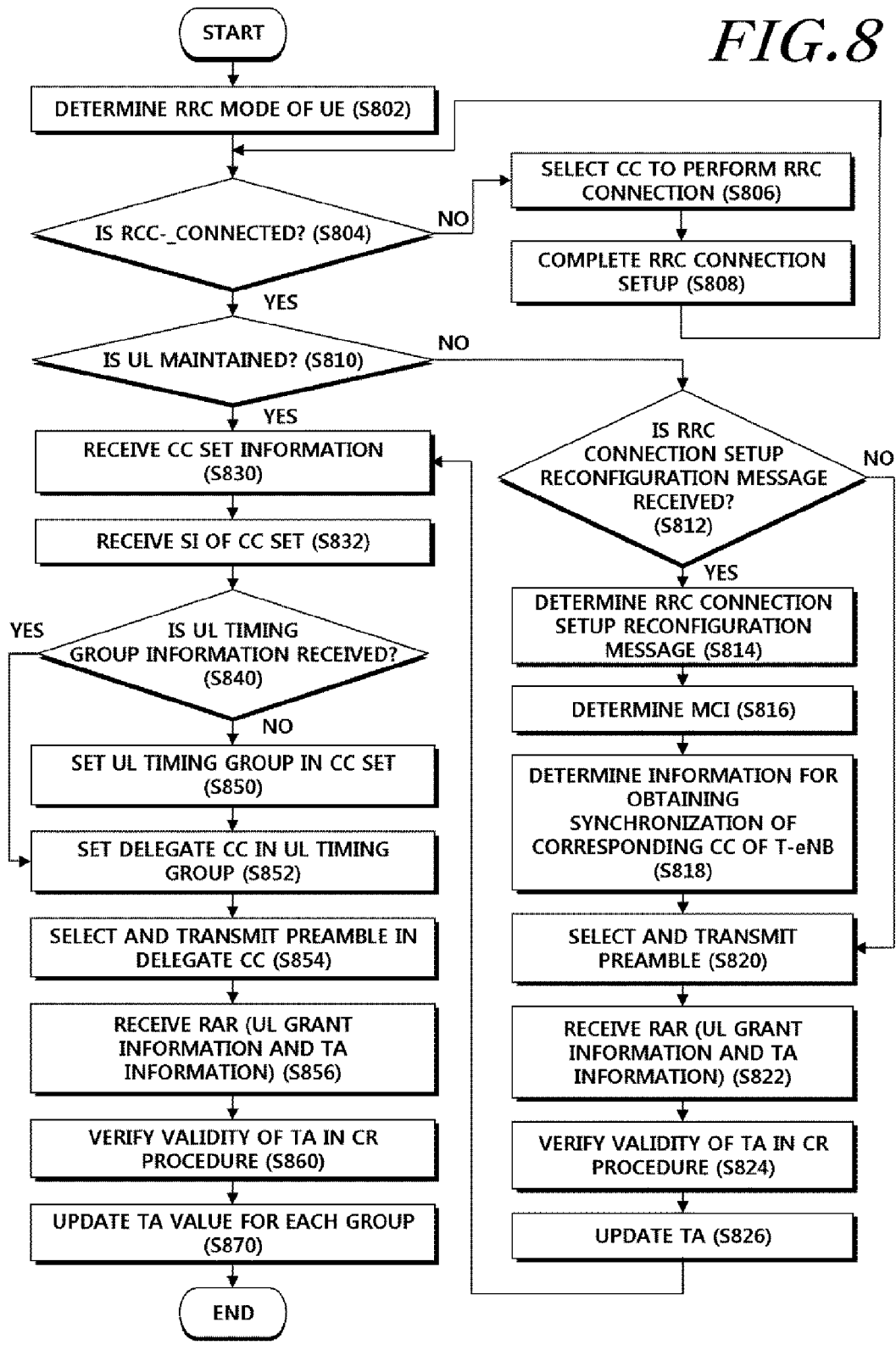
FIG. 8 is a diagram illustrating a process in which a UE obtains a UL synchronization through use of a UL timing group according to an embodiment of the present invention.

FIG. 8 illustrates a process in which a UE obtains a UL synchronization through use of a UL timing group according to an embodiment of the present invention.

Referring to FIG. 8, the UE may determine an RRC mode (step S802). When the RRC mode is different from an RRC_CONNECTED mode, that is, when the RRC mode is an IDLE mode, the UE may perform RRC connection setup.

Accordingly, the UE may select a predetermined CC through which RRC connection is performed (step S806), may transmit an RRC connection request message to the selected predetermined CC, may receive an RRC connection setup message from the eNB through the selected predetermined CC, and may transmit an RRC connection setup complete message to the eNB so as to complete RRC connection setup (step S808).

When the UE corresponds to the RRC_CONNECTED mode (step S804), whether a UL is continuously maintained may be determined (step S810).

When the UL is not maintained, step S812 may be performed. In step S812, the UE may determine whether an RRC connection setup reconfiguration message is received from the eNB (step S812).

Here, when the RRC mode of the UE is the IDLE mode, or when the RRC connection setup reconfiguration is performed, the eNB may have difficulty in defining a CC set and transmitting CC set information. Accordingly, the UE may f-i) select a CC that is most appropriate for attempting RRC connection based on information measured by the UE, or may select at least one CC to perform RRC connection through use of one of f-ii) information fixedly set in a system and stored in an internal memory of the UE, f-iii) information transmitted to the UE from the eNB through SI, or f-iv) SI of available CCs stored in an internal memory of the UE and thus, may form the CC set information. When the mode of the UE is changed to the RRC_CONNECTED mode after completing RRC connection setup, step S830 may be performed.

When the UE performs handover, the UE may determine the received RRC connection setup reconfiguration message (step S814), and determine mobility control information (MCI) (step S816). The UE may determine information to be used for obtaining synchronization of a corresponding CC from a target eNB (T-eNB), based on the MCI information. That is, the UE may obtain a UL synchronization from the T-eNB. When the UE does not perform handover, the UE may merely determine the received RRC connection setup reconfiguration message (step S814), and may not proceed with steps S816 and S818.

In other words, when the UE does not perform handover in the process of obtaining a UL synchronization, the UE may proceed with a procedure for obtaining a UL synchronization between a source eNB (S-eNB) and a corresponding CC so as to obtain the UL synchronization. As another example, when the UE performs handover, the UE may proceed with a procedure for obtaining a UL synchronization of a corresponding CC based on SI of a CC of a T-eNB received from an S-eNB, so as to obtain the UL synchronization. Desirably, a random access procedure may be used, and other procedures may also be applicable.

Subsequently, to obtain synchronization with the S-eNB or the T-eNB, the UE may select a preamble and may transmit the preamble to the S-eNB or the T-eNB (step S820). The preamble may be included in a synchronization request message through which the UE requests synchronization. The UE may receive an RAR message from the S-eNB or the T-eNB in response to transmission of the preamble. In the RAR message, UL grant information for the UE and TA information for each group including at least one CC to be used for obtaining a UL synchronization may be included (step S822).

The UE may verify whether the TA received through a CR procedure in step S822 is valid (step S824), and the UE may update a UL timing group including at least one CC based on the received TA value (step S826) when the UE determines that the TA is valid.

When the RRC connection setup reconfiguration message is not received, step S820 may be performed.

When a UL is maintained or when the UE obtains a UL synchronization, the UE may receive CC set information from the eNB (step S830). Also, the UE may receive SI of the received CC set (step S832).

Subsequently, the UE may determine whether UL timing group information is received (step S840). In this example, when the UL timing group information is generated by the eNB, the UE may receive the UL timing group through the CC set information receiving process or through a separate message. The UL timing group information may include delegate CC information for each group. When the delegate CC information for each group is included in the UL timing group, step S852 may not be performed. When the delegate CC information for each group is not included in the UL timing group, the UE may determine the received UL timing group, and may set a delegate CC for the corresponding UL timing group (step S852). The delegate CC may be set based on the conditions c-i) through c-v) of FIG. 4. Also, the delegate CC used for adjusting a TA value of each UL timing group may be set by applying the same criterion to all groups, or by applying a different criterion based on a characteristic of each UL timing group.

When the UL timing group information is not received or when the received timing group is inappropriate for a radio network state where the UE is located or inappropriate for the UE, the UE may set UL timing group information based on the received CC set information (step S850). Also, the UE may set a predetermined CC in the set UL timing group, as a delegate CC for the timing group (step S852).

The UE may select a preamble and may transmit the preamble through the delegate CC (step S854). This may also be applicable when a TA needs to be updated after the delegate CC is set.

The UE may receive an RAR message from the eNB. In this example, the UE may receive UL grant information for the UE and the TA information for each UL group (step S856). Here, the UE may determine a TA value in a form of a table corresponding to a group index of each UL timing group. Also, the UE may determine a TA difference value in a form including a unit error for each timing group based on a predetermined reference TA value. Also, the UE may determine an error for each UL timing group that has a size of an integer-multiple of a predetermined unit value, and may also determine an error for each UL timing group that is specified in detail. Also, the UE may determine a TA indicator determined to be an indicator based on a predetermined rule.

Subsequently, the UE may verify the validity of a TA through a CR procedure (step S860).

When the UE determines that the TA is valid, the UE may update a TA value for each UL timing group (step S870).

Here, the UE may transmit the updated TA value for each UL timing group to the eNB through a delegate CC. That is, a procedure of determining the TA value may be additionally performed to obtain accurate synchronization with the eNB.

Figure 9:
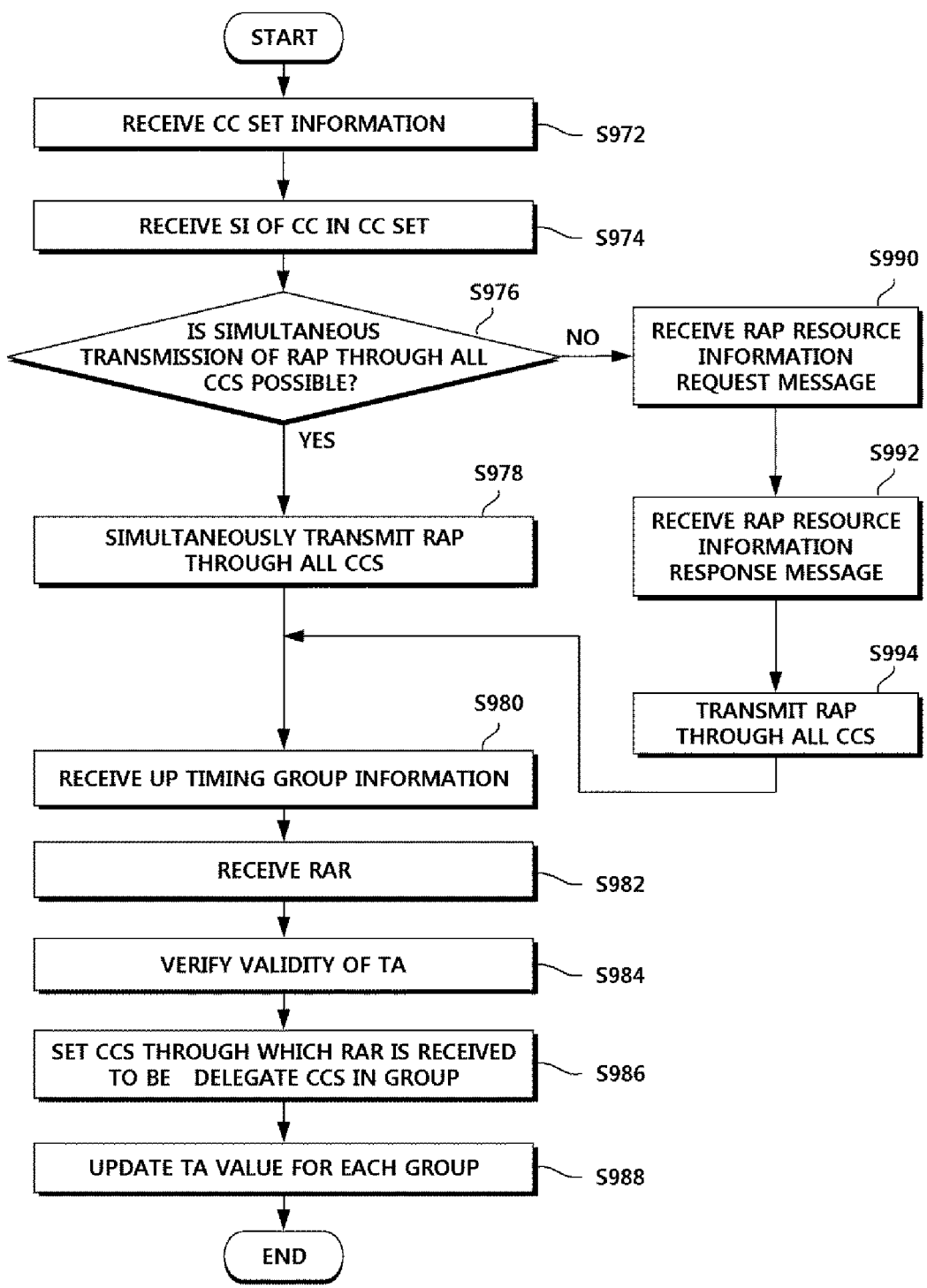
FIG. 9 is a diagram illustrating a process in which a UE obtains a UL synchronization through use of a UL timing group according to an embodiment of the present invention.

FIG. 9 illustrates operations of a UE according to an embodiment of the present invention. Here, FIG. 9 shows the operations of the UE when setting of an initial UL timing group is performed in an eNB.

Referring to FIG. 9, the UE may receive CC set information from the eNB (step S972). The CC set information may be received via a PCC or a Pcell. The PCC may correspond to the PCell as described in the foregoing. A UE in an IDLE mode may select a single DL CC based on the condition described in the foregoing, for RRC connection, and may receive SI through a broadcasting channel transmitted through the selected CC. The CC set information may be transmitted through an RRC message.

The UE may receive SI associated with CCs in the CC set, based on the received CC set information (step S974). The SI may be transmitted to a plurality of UEs in common through a broadcasting channel or may be transmitted through an RRC message in a form of a dedicated channel. The SI may be transmitted through the PCC. Accordingly, the UE may configure UL CCs in the CC set based on the SI.

In step S974, the UE may receive an RAP of each CC or information associated with time/frequency resources to be used by the UE, from the eNB. The UE may configure an initial UL timing group based on the received RAP of each CC or the information associated with the time/frequency resources. The RAP or the information associated with the time/frequency resources may be included in the SI for transmission through the PCC, or may be transmitted in a form of an RRC message.

The UE may determine whether simultaneous transmission of the RAP through all UL CCs configured for obtaining a UL synchronization is possible, based on CC parameters and RACH information included in the received SI (step S976).

Here, the UE may determine a UE-specific RACH parameter from among RACH parameters of the UL CCs configured by the eNB.

In this example, when RAP information is set in the UE-specific RACH parameter, the UE may determine the RAP information of the UE and may set an RAP to be transmitted through each of the configured UL CCs. Here, the RAP information may be preamble information set to be different for each UE for distinguishing the UEs.

When time/frequency resource information is set in the UE-specific RACH parameter, the UE may determine the time/frequency resource information of the UE, and may set an RAP to be transmitted to the configured UL CCs. Here, the time/frequency resource information may be set by the eNB to be different for each UE.

When simultaneous transmission of the RAP through all the configured UL CCs is possible in step S976, the UE may simultaneously transmit the RAP (step S978).

Conversely, when it is determined that the UE is incapable of simultaneously transmitting the RAP through all the UL CCs in step S976, the UE may proceed with step S990.

With respect to the simultaneous transmission of the RAP, the UE may determine RACH parameters included in SI of each of a plurality of UL CCs, and determine a plurality of time/frequency resources defined in the RACH parameters, and may select a RAP transmission time (rach_t) for transmitting the RACH at the same time. The RAP transmission time (rach_t) may correspond to a time when the RAPs are simultaneously transmitted by the UE through all the UL CCs.

When the UE is incapable of setting the RAP transmission time (rach_t), that is, when the UE is incapable of transmitting the RAP through all the configured UL CC at the same time, the UE may transmit an RAP resource information request message to the eNB (step S990).

For example, it is assumed that a time for determining the RACH parameters of all the UL CCs and transmitting RAP is limited to t0 and t1. When the UE determines that transmitting RAP through CC1, CC3, and CCN is allowed at t0, and is not allowed at t1, and the UE determines that transmitting RAP through CC2 is allowed at t1, and is not allowed at t0, the UE may transmit an RAP resource information request message to the eNB.

Subsequently, in response to the RAP resource information request, the UE may receive an RAP resource information response message from the eNB (step S992). Here, the eNB that receives the RAP resource information request message may determine that the UE is incapable of simultaneously transmitting the RAP through all the CCs. Therefore, the eNB may include transmission time/frequency resource to be used for RAP transmission of the UE and a type of a preamble in the RAP resource information response message for transmission to the UE.

Accordingly, the UE may transmit the RAP through all UL CCs configured based on information included in the RAP resource information response message (step S994). When the RAP resource information does not exist in the RAP resource information response message received from the eNB, a time that is closest to the time when the RAP needs to be transmitted may be selected so that the RAP may be simultaneously transmitted through all the UL CCs. In this example, the same RAP may be selected from all the CCs and may be simultaneously transmitted.

Subsequently, the UL timing group information may be received from the eNB through a PCC. That is, the eNB may determine RAPs transmitted from the UE, may determine that the UE requests configuration of a UL timing group, may calculate a TA value based on the preambles received through the RAPs, and may generate the UL timing group of the UE based on the calculated TA. The UL timing group information of the generated UL timing group may be transmitted to the UE.

The UL timing group information may be received through the PCC (PCell) in a form of a PDCCH or control information of a MAC message, or may be received through an RRC message.

The UE may simultaneously receive RAR from the eNB through a few or all of DL CCs having linkages with all the configured UL CCs (step S982). The linkage may be set fixedly in a wireless communication system, or may be set for each eNB based on SI, or may be set for each UE or for each UE group based on an RRC message.

The RAR message may include, for example, identification information of the UE preamble received by the eNB, an identifier (ID) of the eNB, a temporary C-RNTI, information associated with a time slot where the UE preamble is received, UL grant information, TA information for obtaining a UL synchronization, and the like.

Accordingly, the UE may transmit data through a PUSCH through use of time/frequency resource information included in the UL grant information at a scheduled time determined based on the received TA information, and may perform HARQ.

The UE may simultaneously verify the validity of the TA with respect to CCs through which the RAR is received (step S984). In this example, when RAP information is set in the UE-specific RACH parameter, the UE may omit verifying the validity of the TA.

As described in the foregoing, the UE may determine whether C-RNTI, T_C-RNTI, or UE identity included in an ACK message received from the eNB is identical to C-RNTI, T_C-RNTI, or UE identity assigned to the UE, so as to simultaneously verify the validity of the TA. Here, the UE may transmit an L2/L3 message including the C-RNTI, the T_C-RNTI, or the UE identity to the eNB, and may receive an L1/L2 message from the eNB since the ACK message is based on the HARQ operation.

The UE may recognize that the eNB sets UL CCs having linkages with the received DL CC through which the RAR is received as delegate CCs in a group, and may set the UL CCs as the delegate CCs in the group (step S986).

The UE may apply a TA value of the delegate CC received in step S972 to remaining CCs in each group for updating (step S988).

Figure 10:
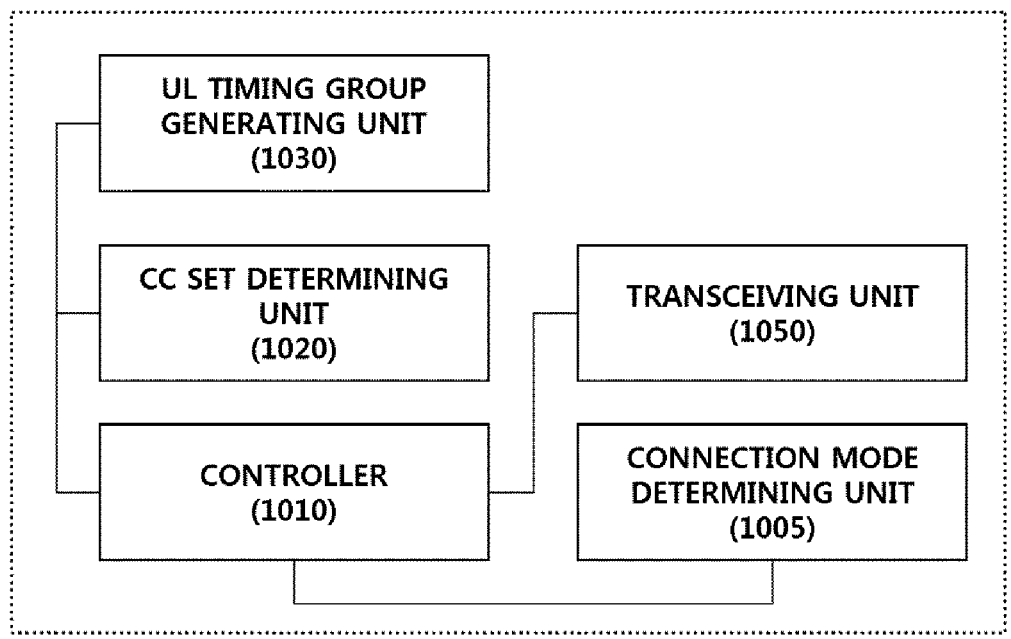
FIG. 10 is a block diagram of an eNB according to an embodiment of the present invention.

FIG. 10 illustrates a configuration of a transmitting apparatus according to an embodiment of the present invention.

Referring to FIG. 10, a transmitting apparatus 1000 may include a connection mode determining unit 1005 to determine an RRC mode of a UE, a CC set determining unit 1020 to determine a CC set including at least one CC available to the UE, a UL timing group generating unit 1030 to generate a UL timing group, a transceiving unit 1050, and a controller 1010 to control the above component elements.

The controller 1010 may generate UL synchronization information corresponding to the UL timing group, so as to establish a UL synchronization. The transceiving unit 1050 may receive a synchronization request message from the UE through at least one delegate CC in the UL timing group, and may transmit the UL synchronization information to the UE through the at least one delegate CC. The at least one delegate CC may be selected by the UE based on a state of the UL timing group and characteristics of a plurality of CCs forming the UL timing group, so as to obtain the UL synchronization. In particular, the at least one delegate CC may correspond to at least one of c-i) through c-v). The CC may be included in the serving cell as described in the foregoing.

In particular, the RRC mode determining unit 1005 may determine a connection mode between the UE and the eNB, and when the UE and the eNB are not connected, that is, when the connection mode is an RRC_IDLE mode or UL synchronization is not established, the RRC mode determining unit 1005 may change the connection mode of the UE to an RRC_CONNECTED mode or may enable the UL synchronization to be established. In this example, RRC connection setup may be performed through use of the UE and a PCC as described in the foregoing.

For example, the RRC mode determining unit 1005 may operate the transceiving unit 1050 to receive an RRC connection request transmitted from the UE, and to transmit an RRC connection setup message to the UE. Also, the RRC mode determining unit 1005 may receive an RRC connection setup complete message from the UE, may complete the RRC connection setup, and may determine an UE RRC_CONNECTED mode.

The CC set determining unit 1020 may determine at least one CC available to the UE, and may set a CC set of the UE. In this example, the CC set for the UE may be set based on a difference in UL synchronization times of the available (configurable) CCs, type information of each CC, a center frequency location of each CC, a service type of each CC, a network service for each CC, and the like.

The controller 1010 may set the CC set determined by the CC set determining unit 1020 as a CC set to be used by the UE, and the transceiving unit 1050 may transmit information associated with the set CC set to the UE through a PCell or a primary CC, before receiving the synchronization request message.

The UL timing group generating unit 1030 may generate the UL timing group of the UE based on the CC set determined by the CC set determining unit 1020. Here, the UL timing group may be generated to satisfy at least one of the conditions a-i) through a-v) or b-i) through b-iv), and may be determined by comparing a difference in center frequency values of CCs with a threshold, determining whether the CCs have the same beamforming scheme or different beamforming schemes, determining whether the CCs are updated in response to a UL synchronization update request, or determining whether the CCs correspond to CCs that are incapable of providing services in a macrocell but are capable of providing services in a space superposed by a cell smaller than the macrocell, such as a femtocell, a picocell, a micorcell, a relay, a repeater, and the like.

The transceiving unit 1050 may transmit the CC set information and UL timing group information to the UE. In this example, the transceiving unit 1050 may transmit the UL timing group information together with the CC set information as shown in FIG. 5, or may transmit the UL timing group information and the CC set information separately as shown in FIG. 6. Also, the transceiving unit 1050 may additionally transmit SI after transmitting the CC set information. Therefore, the UE may be able to configure the UL timing group based on the CC set information and the SI.

The transceiving unit 1050 may receive, from the UE, the synchronization request message requesting synchronization, for example, a message including an RAP. That is, the RAP transmitted through the delegate CC determined by the UE for the UL timing group may be determined, and a TA value for each UL timing group may be transmitted. The synchronization request message may be received through at least one delegate CC, simultaneously or sequentially at separated time.

The transceiving unit 1050 may change a portion or all of the UL timing group determined by the UL timing group generating unit 1030, based on the RAP message transmitted from the UE.

The controller 1010 may control the transceiving unit 1050 to generate information associated with synchronization based on the received RAP, for example, a message including UL grant information, TA information associated with the synchronization, and the like, and to transmit the generated information to the UE. In this example, the message including the TA information may include an RAR message. The information associated with the synchronization may include TA information required to move up a UL transmission time. Therefore, the controller 1010 may control the transceiving unit 1050 to generate and transmit synchronization information with respect to the UL timing group.

Here, the controller 1010 may generate TA information for each UL timing group in a form of a table including a TA value corresponding to a group index, in a form of a TA value including a unit error for each timing group. The error for each timing group may have a size of an integer-multiple of a predetermined unit value, or may be specified in detail. Also, the controller 1010 may control the transceiving unit 1050 to transmit the TA information for each UL timing group as an indicator indicating a TA based on a predetermined rule. The TA value may be an example of the UL synchronization information required when the UE adjusts a UL transmission time, and the synchronization information for the UL timing group may be transmitted through one or more delegate CCs, simultaneously or at separated time.

The UL synchronization information, as described in the foregoing, may be calculated by comparing, with a predetermined threshold, a difference in center frequency values of a plurality of CCs in the CC set configured for the UE, or may be calculated to enable the CCs to have different transmission times by determining whether the CCs correspond to CCs having the same beamforming scheme, correspond to CCs updated in response to a synchronization update request, or correspond to CCs that do not provide services in a macrocell but provide services in a space superposed by a coverage cell smaller than the macrocell.

Also, the controller 1010 may control all component elements, and a few component elements may independently operate. The component elements of FIG. 10 may be configured as a single module or two or more modules, or may be configured to perform a single function in two or more modules.

Figure 11:
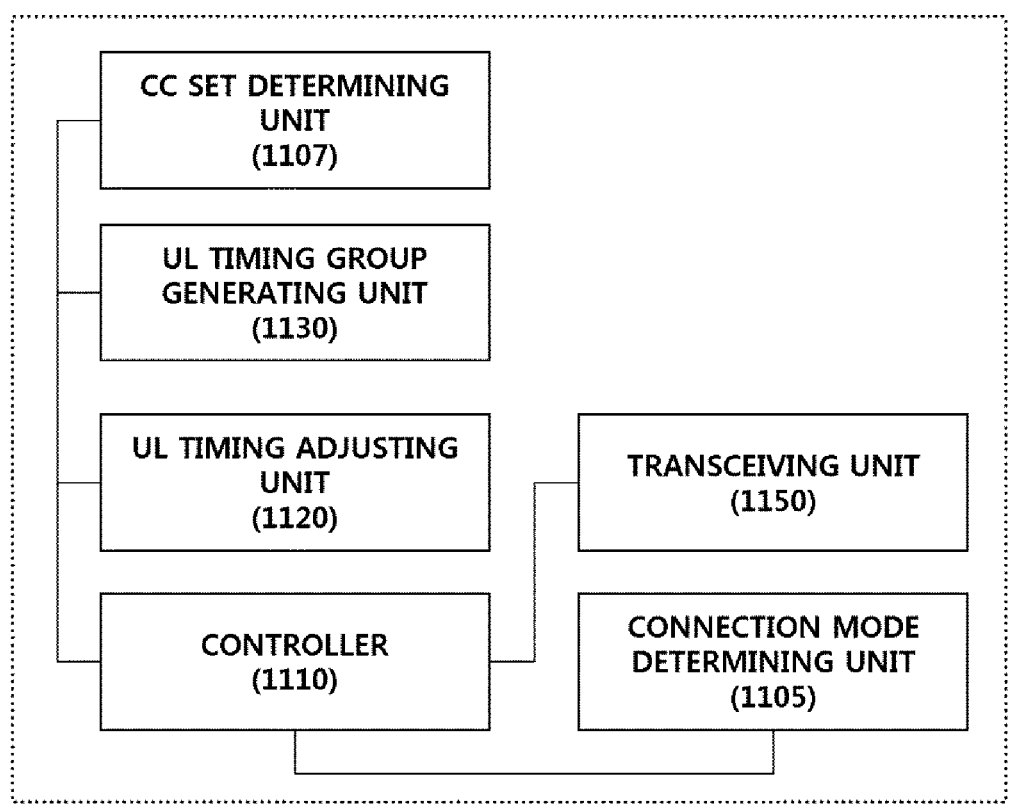
FIG. 11 is a block diagram of a UE according to an embodiment of the present invention.

FIG. 11 illustrates a configuration of a receiving apparatus according to an embodiment of the present invention.

Referring to FIG. 11, a receiving apparatus 1110 may include a connection mode determining unit 1105, a CC set determining unit 1107, a controller 1110, a UL timing adjusting unit 1120, a UL timing group generating unit 1130, and a transceiving unit 1150.

The transceiving unit 1150 may transmit a synchronization request message to an eNB through one or more CCs in a UL timing group, and may receive UL synchronization information through the one or more CCs. The controller 1110 may control the transceiving unit. The controller 1110 may determine the UL synchronization information received through the transceiving unit. The UL timing adjusting unit 1120 may establish a UL synchronization of the UL timing group based on the UL synchronization information determined by the controller. That is, the UL timing adjusting unit 1120 may establish the UL synchronization of the UL timing group based on the UL synchronization information received through the transceiving unit. Here, the controller 1110 may determine UL grant information and a TA value calculated to adjust a UL transmission time for each group corresponding to the UL timing group, through an RAR message received in response to the synchronization request message transmitted through the transceiving unit. The UL timing adjusting unit 1120 may establish a UL synchronization based on the UL synchronization information determined by the controller. In this example, the UL timing adjusting unit 1120 may establish the UL synchronization based on a TA value distinguished based on the UL timing group, based on a unit error distinguished based on the UL timing group, or based on an error distinguished based on the UL timing group and having a size of an integer-multiple of a determined unit value, or using an indicator associated with a rule determined based on the UL timing group. The UL synchronization information may be distinguished based on a group index of the UL timing group.

Here, the one or more delegate CCs may be selected by the UE based on a state of the UL timing group and characteristics of a plurality of CCs forming the UL timing group, so as to obtain the UL synchronization. In particular, the one or more delegate CCs may correspond to at least one of c-i) through c-v). The CCs may be included in a serving cell as described in the foregoing.

In particular, the connection mode determining unit 1105 may determine a connection mode with the eNB. That is, when the connection mode is an UE RRC_IDLE mode or UL synchronization with the eNB is not established, the connection mode determining unit 1105 may enable the UE to change the connection mode to an RRC_CONNECTED mode or enable the UL synchronization to be established. In this example, RRC connection setup may be performed through use of the UE and a PCC as described in the foregoing.

For example, the connection mode determining unit 1005 may transmit an RRC connection request message to the eNB through use of the transceiving unit 1050, may receive an RRC connection setup message from the eNB, and may complete RRC connection setup through use of an RRC connection setup complete message.

The transceiving unit 1150 may perform transmission and reception of information with the eNB. For example, the transceiving unit 1150 may receive CC set information and information associated with synchronization from the eNB. In particular, the transceiving unit 1150 may receive the CC set information from the eNB through a PCell or a primary CC, before transmitting the synchronization request message. After receiving the CC set information, the transceiving unit 1150 may receive SI associated with the CCs in the CC set, from the eNB. The SI may include frequency band information of a CC, information associated with an available frequency magnitude, and the like.

The CC set determining unit 1107 may determine at least one CC available to the UE, from the CC set information. The CC set may be determined based on a difference in UL synchronization times of the CCs available to the UE, type information of each CC, a center frequency location of each CC, a service type of each CC, a network service for each CC, and the like.

The UL timing group generating unit 1130 may generate a UL timing group of the UE based on the CC set determined by the CC set determining unit 920. Here, the UL timing group may be configured by the UE based on the conditions described in FIG. 10 (at least one of conditions a-i) through a-v) or b-I through b-iv)). Also, the UL timing group generating unit 1130 may select a delegate CC of the UL timing group.

For example, when the UL timing group generating unit 1130 receives, from the eNB, UL timing group information of CCs together with the CC set information, the UL timing group generating unit 1130 may select a delegate CC from the received UL timing group. Also, the UL timing group generating unit 1130 may receive, through the transceiving unit 1150, the UL timing group information separately from the CC set information, through a separate signaling.

Therefore, when the transceiving unit 1150 does not receive the UL timing group information of CCs or the UL timing group information generated by the eNB is inappropriate for a network state of the UE, the UL timing group generating unit 1130 may configure a new UL timing group.

Also, the controller 1110 may control the transceiving unit 1150 to transmit a synchronization request message requesting synchronization to the eNB through the delegate CC, and to receive information associated with synchronization from the eNB through the delegate CC.

For example, the controller 1110 may control the transceiving unit 1150 to transmit a message including a RAP selected by the UE, and to receive an RAR message transmitted from the eNB. Also, the controller 1110 may control the transceiving unit 1150 to perform, with the eNB, transmission and reception of a message for RRC reconfiguration and synchronization. The synchronization request message may be transmitted through one or more delegate CCs simultaneously or at separated time.

Also, the controller 1110 may control the UL timing group generating unit 930 to change a portion or all of the determined UL timing group, based on the RAR message.

In particular, the controller 1110 may perform controlling so as to determine a TA value associated with each UL timing group based on the set UL timing group included in the RAR message. Also, the controller 1110 may perform controlling so as to determine frequency resource information assigned for UL transmission of the UE.

The UL timing adjusting unit 1120 may determine the TA value determined by the controller 1110, and may apply the TA value to all CCs of the corresponding UL timing group where the delegate CC is included. That is, the TA value may be applied to the corresponding UL timing group for synchronization with the eNB. Here, TA information for to each UL timing group may be in a form of a table including a TA value corresponding to a group index, in a form of a TA value including a unit error for each timing group, in a form of an error having a size of an integer-multiple of a predetermined unit value, for each timing group, in a form of an error specified in detail for each timing group, or in a form of an indicator indicating a TA based on a predetermined rule. Therefore, the UL timing adjusting unit 1120 may obtain synchronization by applying a determined TA to each UL timing group. The TA value may be an example of UL synchronization information required when the UE adjusts a UL transmission time, and the synchronization information for the UL timing group may be received through one or more delegate CCs simultaneously or at separated time.

For example, when the TA information is included in the synchronization information, the TA information may be set equally to all CCs in the UL timing group.

As described in the foregoing, the controller 1110 may control all component elements, and a few component elements may independently operate. The component elements of FIG. 11 may be configured as a single module or two or more modules, and may be configured to perform a single function in two or more modules.

Based on the descriptions of FIG. 9, the transceiving unit 1150 may receive SI of CCs in the CC set based on the CC set information, and the controller 1110 may control the transceiving unit 1105 to simultaneously transmit the synchronization request message to the eNB through all UL CCs in the CC set, based on the received SI.

Subsequently, the transceiving unit 1105 may receive UL timing group information from the eNB, and simultaneously receive UL synchronization information through a few or all of DL CCs associated with the received UL timing group, and the controller 1110 may set a UL CC associated with a CC through which the UL synchronization information is received as a delegate CC of the received UL timing group.

Therefore, according to an embodiment of the present invention, when a plurality of CCs is used, a different UL synchronization may be obtained for each CC or for each CC group and thus, when the UE transmits information in a UL through a plurality of CCs, data transmission error due to an error in obtaining synchronization and delay in receiving information in the eNB may be effectively reduced.

Also, when a UL synchronization standard is different for each of the plurality of CCs, the UE may obtain a UL synchronization based on a type of each CC, a center frequency location, and a service type.

The invention claimed is:

1. A method for an evolved Node-B (eNB) to establish an uplink (UL) synchronization in a wireless communication system, the method comprising:
   transmitting information associated with a Component Carrier (CC) set to be used by a user equipment (UE) through a primary CC;
   transmitting, to the UE, system information of CCs of the CC set based on the information of the CC set;
   transmitting, to the UE, UL timing group information indicating UL timing groups, the UL timing groups each comprising one or more UL CCs;
   receiving a synchronization request message from a user equipment (UE) through one or more delegate CCs in a UL timing group, the synchronization request message comprising a random access preamble (RAP) signal of a random access channel (RACH) transmission, the UL timing group not including the primary CC, and a secondary UL CC, which is a non-primary CC, being set as a delegate CC in the UL timing group based on the UL timing group information; and
   transmitting UL synchronization information corresponding to the UL timing group to the UE through a random access response (RAR) message to establish the UL synchronization, the UL synchronization information comprising a time advance (TA) value corresponding to the UL timing group,
   wherein the one or more delegate CCs are selected by the UE based on a state of the UL timing group and characteristics of a plurality of CCs forming the UL timing group to establish the UL synchronization, the one or more delegate CCs of the UL timing group being a secondary CC different from the primary CC for Radio Resource Control (RRC) connection, and
   wherein the TA value is applied to the plurality of CCs in the UL timing group for uplink synchronization.

2. The method as claimed in claim 1, wherein the one or more delegate CCs correspond to at least one of i) a CC having a lowest center frequency value, ii) a CC having a center frequency value that is closest to a mean value, iii) a CC having a highest center frequency value, iv) a CC having a broadest frequency band, and v) a CC that is set to be used for monitoring downlink (DL) quality, from among the plurality of CCs forming the UL timing group; and the CC is included in one or more serving cells.

3. The method as claimed in claim 1, wherein the UL timing group is configured of i) at least one CC having a difference in a center frequency value within a threshold range, ii) at least one CC to which a same beamforming scheme is applied, iii) at least one CC used in devices in a same radio network, or iv) at least one CC that does not belong to another UL timing group, from among the plurality of CCs; and
the UL timing group is generated by the UE or the eNB.

4. The method as claimed in claim 1, further comprising:
setting the CC set to be used by the UE, before receiving the synchronization request message.

5. The method as claimed in claim 4, further comprising:
configuring a UL timing group including at least one of i) at least one CC having a difference in a center frequency value within a threshold range, ii) at least one CC to which a same beamforming scheme is applied, iii) at least one CC used in devices in a same radio network, and iv) at least one CC that does not belong to another UL timing group, from among the CC set; and
transmitting information associated with the UL timing group and information associated with the CC set to the UE through a same message, or transmitting the information associated with the UL timing group to the UE through a different message after transmitting the information associated with the CC set.

6. The method as claimed in claim 1, wherein receiving of the synchronization request message comprises:
receiving the random access preamble signal according to a contention-free selection,
wherein the eNB simultaneously or sequentially receives random access preamble signals from the UE through delegate CCs.

7. The method as claimed in claim 1, further comprising:
calculating the TA value that adjusts a UL transmission time for the UL timing group, in response to the received synchronization request message; and
transmitting, to the UE, the calculated TA value together with UL grant information for the UE through a random access response message.

8. The method as claimed in claim 1, wherein the UL synchronization information is calculated by comparing, with a predetermined threshold, a difference in center frequency values of the plurality of CCs in a CC set that is set to be used by the UE; or
the UL synchronization information is calculated to enable the CCs to have different transmission times by determining whether the CCs correspond to CCs having a same beamforming scheme, correspond to CCs updated in response to a synchronization update request, or correspond to CCs that do not provide services in a macrocell but provide services in a space superposed by a coverage cell that is smaller than the macrocell.

9. A method for a user equipment (UE) to establish an uplink (UL) synchronization in a wireless communication system, the method comprising:
receiving information associated with a Component Carrier (CC) set to be used by the UE, from an evolved Node-B (eNB) through a primary CC;
receiving system information of CCs of the CC set based on the information of the CC set;
receiving UL timing group information indicating UL timing groups from the eNB, the UL timing groups each comprising one or more UL CCs;
setting a secondary UL CC, which is a non-primary CC, to be a delegate CC in a UL timing group based on the UL timing group information, the UL timing group not including the primary CC;
transmitting a synchronization request message to the eNB through one or more delegate CCs in the UL timing group, the synchronization request message comprising a random access preamble (RAP) signal of a random access channel (RACH) transmission;
receiving UL synchronization information corresponding to the UL timing group for establishing the UL synchronization, from the eNB through a random access response (RAR) message, the UL synchronization information comprising a time advance (TA) value corresponding to the UL timing group; and
establishing synchronization by applying, to the UL timing group, the UL synchronization information received through the one or more delegate CCs in the UL timing group,
wherein the one or more delegate CCs in the UL timing group are selected by the UE based on a state of the UL timing group and characteristics of a plurality of CCs forming the UL timing group to establish the UL synchronization, at least one of the one or more delegate CCs in the UL timing group being a secondary CC different from the primary CC for Radio Resource Control (RRC) connection, and
wherein the TA value is applied to the plurality of CCs in the UL timing group for uplink synchronization.

10. The method as claimed in claim 9, wherein the one or more delegate CCs correspond to at least one of i) a CC having a lowest center frequency value, ii) a CC having a center frequency value that is closest to a mean value, iii) a CC having a highest center frequency value, iv) a CC having a broadest frequency band, and v) a CC that is set to be used for monitoring downlink (DL) quality, from among the plurality of CCs forming the UL timing group; and the CC is included in one or more serving cells.

11. The method as claimed in claim 9, wherein the UL timing group is configured of i) at least one CC having a difference in a center frequency value within a threshold range, ii) at least one CC to which a same beamforming scheme is applied, iii) at least one CC used in devices in a same radio network, or iv) at least one CC that does not belong to another UL timing group, from among the plurality of CCs; and the UL timing group is generated by the UE or the eNB.

12. The method as claimed in claim 9, further comprising:
receiving UL timing group information and the CC set information through the same message; or
receiving the UL timing group information from the eNB through a different message after receiving the CC set information.

13. The method as claimed in claim 9, wherein transmitting of the synchronization request message comprises:
transmitting the random access preamble signal according to a contention-free selection,
wherein the UE simultaneously or sequentially transmits random access preamble signals to the eNB through delegate CCs.

14. The method as claimed in claim 9, further comprising:
receiving the TA value that is calculated to adjust a UL transmission time for the UL timing group in response to the transmitted synchronization request message, together with UL grant information from the eNB through a random access response message.

15. The method as claimed in claim 9, wherein the UL synchronization information is configured to include the TA value distinguished based on the UL timing group, to include a unit error distinguished based on the UL timing group, or to include an error distinguished based on the UL timing group and having a size of an integer-multiple of a predetermined unit value, or is configured as an indicator associated with a rule determined based on the UL timing group; and the UL synchronization information is distinguished based on a group index of the UL timing group.

16. An evolved Node-B (eNB) to establish an uplink (UL) synchronization in a wireless communication system, the eNB comprising:
a controller to generate UL synchronization information corresponding to one or more UL timing groups to establish the UL synchronization, the UL synchronization information comprising a time advance (TA) value corresponding to each UL timing group; and
a transceiving unit to transmit information associated with a Component Carrier (CC) set to be used by a user equipment (UE) through a primary CC, to transmit, to the UE, system information of CCs of the CC set based on the information of the CC set, to transmit, to the UE, UL timing group information indicating UL timing groups, to receive a synchronization request message from a user equipment (UE) through one or more delegate CCs in the UL timing group, and to transmit the UL synchronization information to the UE through a random access response (RAR) message, the synchronization request message comprising a random access preamble (RAP) signal of a random access channel (RACH) transmission, and a secondary UL CC, which is a non-primary CC, being set as a delegate CC in a UL timing group based on the UL timing group information, wherein the UL timing groups each comprises one or more UL CCs, and the UL timing group does not include the primary CC,
wherein the one or more delegate CCs are selected by the UE based on a state of the UL timing group and characteristics of a plurality of CCs forming the UL timing group to establish the UL synchronization, at least one of the one or more delegate CCs being a secondary CC different from a primary CC for Radio Resource Control (RRC) connection, and
wherein the TA value is applied to the plurality of CCs in the UL timing group for uplink synchronization.

17. The eNB as claimed in claim 16, wherein the controller determines that the one or more delegate CCs correspond to at least one of i) a CC having a lowest center frequency value, ii) a CC having a center frequency value that is closest to a mean value, iii) a CC having a highest center frequency value, iv) a CC having a broadest frequency band, and v) a CC that is set to be used for monitoring DL quality, from among the plurality of CCs forming the UL timing group; and the CC is included in one or more serving cells.

18. The eNB as claimed in claim 16, further comprising:
a UL timing group generating unit to generate the UL timing group to include i) at least one CC having a difference in a center frequency value within a threshold range, ii) at least one CC to which a same beamforming scheme is applied, iii) at least one CC used in devices in a same radio network, or iv) at least one CC that does not belong to another UL timing group, from among the plurality of CCs.

19. The eNB as claimed in claim 16, further comprising:
a CC set determining unit to determine a CC set,
wherein the controller sets the CC set to be used by the UE based on the determined CC set; and
the transceiving unit transmits the information associated with the set CC set to the UE through the primary CC, based on controlling of the controller, before receiving the synchronization request message.

20. The eNB as claimed in claim 16, wherein the controller performs:
transmitting UL timing group information and CC set information through a same message; or
transmitting the UL timing group information to the UE through a different message, after transmitting the CC set information.

21. The eNB as claimed in claim 16, wherein the transceiving unit performs:
determining whether the synchronization request message is the random access preamble signal, the random access preamble signal being generated according to a contention-free selection,
wherein the eNB simultaneously or sequentially receives random access preamble signals from the UE through delegate CCs.

22. The eNB as claimed in claim 16, wherein the controller performs:
calculating the TA value to adjust a UL transmission time for the UL timing group, in response to the received synchronization request message; and
controlling the transceiving unit to transmit, to the UE, the calculated TA value together with UL grant information for the UE through a random access response message.

23. The eNB as claimed in claim 16, wherein the controller calculates the UL synchronization information by comparing, with a predetermined threshold, a difference in center frequency values of a plurality of CCs in the CC set configured for the UE, or calculates the UL synchronization information to enable the CCs to have different transmission times by determining whether the CCs correspond to CCs to which a same beamforming scheme is applied, correspond to CCs updated in response to a synchronization update request, or correspond to CCs that do not provide services in a macrocell but provide services in a space superposed by a coverage cell that is smaller than the macrocell.

24. A user equipment (UE) to establish an uplink (UL) synchronization in a wireless communication system, the UE comprising:
a transceiving unit to receive information associated with a Component Carrier (CC) set to be used by the UE, from an evolved Node-B (eNB) through a primary CC, to receive system information of CCs of the CC set based on the information of the CC set, to receive UL timing group information indicating UL timing groups from the eNB, the UL timing groups each comprising one or more UL CCs, to transmit a synchronization request message to the eNB through one or more delegate CCs in a UL timing group, and to receive UL synchronization information corresponding to the UL timing group through a random access response (RAR) message, the synchronization request message comprising a random access preamble (RAP) signal of a random access channel (RACH) transmission;
a controller to set a secondary UL CC, which is a non-primary CC, to be a delegate CC in the UL timing group based on the UL timing group information, and to determine the UL synchronization information received by the transceiving unit, the UL synchronization information comprising a time advance (TA) value corresponding to the UL timing group, and the UL timing group not including the primary CC; and a UL timing adjusting unit to establish a UL synchronization of the UL timing group, based on the UL synchronization information determined by the controller, wherein the one or more delegate CCs in the UL timing group are selected by the UE based on a state of the UL timing group and characteristics of a plurality of CCs forming the UL timing group to establish the UL synchronization, at least one of the one or more delegate CCs being a secondary CC different from a primary CC for Radio Resource Control (RRC) connection, and wherein the TA value is applied to the plurality of CCs in the UL timing group for uplink synchronization.

25. The UE as claimed in claim 24, further comprising:

a UL timing group generating unit to select, to be a delegate CC, at least one of i) a CC having a lowest center frequency value, ii) a CC having a center frequency value that is closest to a mean value, iii) a CC having a highest center frequency value, iv) a CC having a broadest frequency band, and v) a CC that is set to be used for monitoring downlink (DL) quality, from among the plurality of CCs forming the UL timing group, wherein the CC is included in one or more serving cells.

26. The UE as claimed in claim 24, wherein the UL timing group generating unit generates the UL timing group to include i) at least one CC having a difference in a center frequency value within a threshold range, ii) at least one CC to which a same beamforming scheme is applied, iii) at least one CC used in devices in a same radio network, or iv) at least one CC that does not belong to another UL timing group, from among a plurality of CCs.

27. The UE as claimed in claim 24, wherein the controller performs:

controlling the transceiving unit to receive UL timing group information and the CC set information through a same message; or controlling the transceiving unit to receive the UL timing group information from the eNB through a different message, after receiving the CC set information.

28. The UE as claimed in claim 24, wherein the transceiving unit performs:

determining whether the synchronization request message is the random access preamble signal, the random access preamble signal being generated according to a contention-free selection, wherein the UE simultaneously or sequentially transmits random access preamble signals to the eNB through delegate CCs.

29. The UE as claimed in claim 24, wherein the controller determines UL grant information and the TA value calculated to adjust a UL transmission time for the UL timing group, through a random access response message received in response to the synchronization request message transmitted by the transceiving unit.

30. The UE as claimed in claim 24, wherein the UL timing adjusting unit establishes the UL synchronization based on the UL synchronization information determined by the controller, through use of the TA value distinguished based on the UL timing group, a predetermined unit error distinguished based on the UL timing group, an error distinguished based on the UL timing group and having a size of an integer-multiple of a predetermined unit value, or an indicator associated with a rule determined based on the UL timing group; and the UL synchronization information is distinguished based on a group index of the UL timing group.

* * * * *